(12) United States Patent
Di Martino

(10) Patent No.: US 11,996,990 B2
(45) Date of Patent: May 28, 2024

(54) WIRELESS CONNECTIVITY FOR AUTONOMOUS DEVICES

(71) Applicant: Nokia Solutions and Networks Oy, Espoo (FI)

(72) Inventor: Catello Di Martino, Uberlandia (BR)

(73) Assignee: Nokia Solutions and Networks Oy, Espoo (FI)

( * ) Notice: Subject to any disclaimer, the term of this patent is extended or adjusted under 35 U.S.C. 154(b) by 239 days.

(21) Appl. No.: 17/151,535

(22) Filed: Jan. 18, 2021

(65) Prior Publication Data

US 2022/0231923 A1 Jul. 21, 2022

(51) Int. Cl.
*H04L 41/5009* (2022.01)
*H04L 41/5025* (2022.01)
*H04L 43/08* (2022.01)
*H04L 43/16* (2022.01)

(52) U.S. Cl.
CPC ...... *H04L 41/5009* (2013.01); *H04L 41/5025* (2013.01); *H04L 43/08* (2013.01); *H04L 43/16* (2013.01)

(58) Field of Classification Search
CPC . H04L 41/5009; H04L 41/5025; H04L 43/08; H04L 43/16; H04L 41/50254
USPC ...................................................... 370/252
See application file for complete search history.

(56) References Cited

U.S. PATENT DOCUMENTS

| | | | | |
|---|---|---|---|---|
| 2009/0313279 | A1* | 12/2009 | Tomaszewski | G06F 16/2453 707/999.102 |
| 2012/0011517 | A1* | 1/2012 | Smith | G06F 11/3006 715/224 |
| 2012/0294173 | A1* | 11/2012 | Su | H04W 76/28 370/252 |
| 2013/0159139 | A1* | 6/2013 | Richard | G06Q 10/06 705/26.41 |
| 2017/0366595 | A1* | 12/2017 | Feher | H04N 21/2402 |
| 2019/0147387 | A1* | 5/2019 | Fritz | G06Q 10/0639 705/7.14 |
| 2019/0335349 | A1* | 10/2019 | Vaishnavi | H04W 48/18 |
| 2021/0014135 | A1 | 1/2021 | Wong | |

OTHER PUBLICATIONS

Communication pursuant to Article 94(3) EPC, 22 151 181.9-121, Feb. 12, 2024, 8 pages.

* cited by examiner

*Primary Examiner* — Suraj M Joshi
(74) *Attorney, Agent, or Firm* — Tong, Rea, Bentley & Kim, LLC

(57) ABSTRACT

Various example embodiments for supporting wireless connectivity for automated materials handling (AMH) are presented. Various example embodiments for supporting wireless connectivity for AMH may be configured to support wireless connectivity for AMH devices in an AMH environment (e.g., factory floor, mining environment, or the like). Various example embodiments for supporting wireless connectivity for AMH devices in an AMH environment may be configured to ensure that the AMH devices can maintain reliable connectivity to and communication with a network of the AMH environment.

21 Claims, 21 Drawing Sheets

FIG. 3

```
{
"requirements":[
  {
    "function_type":"BANDWIDTH_UPLINK",  // type of the KPI or sounding function
                                          // to consider; it can be any of the
                                          // collected KPI or supported sounding function
    "comparison_operator":"GT",  // logical operator to use in the evaluation of the
                                  // requirement; can assume values as GTE (>=), GT (>),
                                  // EQ (=), LT (<) LTE (<=)
    "number_of_samples_to_consider":5,  // number of samples to consider
    "statistics_type":"95TH_PERCENTILE",  // statistical function to compute on
                                           // the collected samples (5 samples in
                                           // this example)
    "threshold_value":20M,  // threshold used to compute the logical predicate
    "metric_name":"bandwidth"  // name of the KPI to collect
  },
  "function_type":"PING",
  "comparison_operator":"LT",
  "number_of_samples_to_consider":5,
  "statistics_type":"AVERAGE",
  "threshold_value":0.2,
  "metric_name":"ping_avg_latency"
  }
],
"association_operator":"AND",  // it is the association operator needed to evaluate the
                                // SLA condition (in this case BANDWIDTH_UPLINK AND PING
                                //are verified
"traffic_direction":"BIDIRECTIONAL",  // to be applied in uplink and downlink
"trafficClassId":"custom_traffic_class",  // name of the network service to create
"priority":1,  // priority of the service 1 = max, 10 = min
"destinations":[
  "10.1.0.45"  // destination(s) where to compute the
                // requirement from; in this case the
                // requirements will be computed on uplink
                // and downlink given that the traffic_class
                // direction is set to BIDIRECTIONAL
]
}
```

*FIG. 4*

```
{
"enableAnomalyDetection": false,      // whether to feed an anomaly detection algorithm
                                      // with the KPIs collected by this function or not
"enablePrediction": false,            // whether to feed an anomaly prediction algorithm
                                      // with the KPIs collected by this function or not
"executionType": "RUN_PERIODIC",      // type of data collection execution; can assume
                                      // value RUN_PERIODIC (run at fixed intervals),
                                      // RUN_STREAM (run continuously),
                                      // RUN_ONCE (run only once),
                                      // RUN_ON_TRIGGER (on specific conditions)
"functionName": "LTE_BW_UPLINK",      // Symbolic name of the sounding function
"functionParams": {                   // function specific parameters
   "dst":"10.1.0.45",
   "measurement_interval_seconds":"1",
   "max_bandwidth":"30M",
   "port":"5031",
   "additional_options":""
},
"functionType": "BANDWIDTH_UPLINK",   //type of the sounding function
"period": 1000,                       //scheduling period of the function
"starttime": "NOW"                    //when the function should start; can be a date
}
```

*FIG. 7*

| nix.kpi | KPI collected; uses Influx line protocol format |
|---|---|
| nix.automation.trigger | Trigger sent over kafka; can start specific actions if a correspondent listener is programmed by the device manager. |
| nix.endpoint.$CUSTOM_NAME | Topic created on demand when creating a new data collection endpoint over kafka. It runs in dedicated containers that are managed by the nix device manager on demand through the customized kafka client. It is used to forward data from any other source (REST, websocket, public cloud specific protocols, MQTT, AMQ) if programmed to do so by the endpoint manager service. |
| nix.heartbeat | Heartbeat signals from managed devices. It includes a json with the name of the heartbeat and duration from last one. |
| nix.mysql.$CUSTOM_TABLE.$COMMAND | Bridge topic for one-way interaction with mysql database without needing to import library at client side (device manager) and perform queries. Requires json with the same fields as the column in the mysql table specified in $CUSTOM_TABLE. $COMMAND in the topic. include insert, update, delete. |

*FIG. 9*

```
{
"name": "string",
"notification": {
 "action_type": "CALL_BACK_REST_POST",      // the action is a call to a REST post
 "call_back_uri": "URL",                     // url for sending the REST request to
 "include_full_body_trigger": true,
 "message": "MESSAGE TO INCLUDE",            // custom message that can be included in the body
 "metric": "bandwidth",                      // metrics on which to send the request
 "one_time_event": false,
 "operator": "lt",
 "rest_method": "POST",
 "threshold": 20,
 "throttling_time_ms": 2500
 },
}
```

FIG. 8A

| Network Sounding Manager | Creates, schedules and manages the network sounding functions. Supported sounding functions include i) 2 way ping, ii) one way ping, iii) uplink and downlink bandwidth measurements between two endpoints, iv) system load (processor, memory and disk performance counters), v) network performance counters, vi) JVM performance counters. The implementation is system agnostic and it is based on a hardware abstraction layer library that is portable across different platform for fetching hardware/platform dependent performance counters. One way ping is based on the one-way ping (OWAMP) framework. Bandwidth estimation is carried out by integrating the framework with Iperf3. a server is created on the NiX gateway upon a request of network bandwidth sounding from a device manager is received. The NiX device gateway assign the ports to the server and launches a dedicated Iperf3 server. For downlink traffic the Iperf3 reverse mode is used, i.e., traffic is sent from the gateway to the device manager. Iperf3 Bandwidth measurement flows are scheduled on lower priority using the UNIX TC stack and can run on demand. Two way ping uses ICMP ping commands between two endpoints. |
|---|---|
| Data-Driven Automation Manager | Creates, schedules, and manages events mapped to value ranges of the collected KPIs. Events include internal notification through the internal notification bus, or actions. Actions include i) trigger of other events, ii) REST calls, iii) MQTT/Kafka/AMQ/ROS topics, iv) cloud IoT core events through MQTT over TLS connections, v) cloud notifications, vi) WebSocket. Input data can be collected through the same channels (i) – (vi), from all the collected KPIs and performance counters, as well as through GNMI interfaces for supporting streaming telemetry. |
| Anomaly Detection Manager | Provides a pipeline for attaching anomaly detection algorithms to any data collected. At this stage the random cut forest algorithm is supported. The service includes an interface for easy addition of any other anomaly detection algorithm. |
| Data Routing and Public Cloud Connectors | Enable creation of data forwarding policies from any supported data input channel (i) trigger of other events, ii) REST calls, iii) MQTT/Kafka/AMQ/ROS topics, iv) cloud IoT core events through MQTT over TLS connections, v) GNMI, vi) WebSocket), to any supported data output channel (i) trigger of other events, (ii) REST calls, (iii) MQTT/Kafka/AMQ/ROS topics, (iv) cloud IoT core events through MQTT over TLS connections, (v) cloud notifications, (vi) WebSocket), through REST API. |

*FIG. 8B*

| Heartbeat Manager | Creates and manages heartbeats, missed heartbeat actions, and notifications on demand. |
|---|---|
| Alerting Manager | Implement alerting and notification based on data-driven automations and/or time. |
| Fault Injection Manager | Provide basic services to create testing condition to validate whether created SLA can withstand failures. |
| Data Collection Endpoints Creation | Manages the lifecycle of data collection endpoint. It is the frontend micro-service to create to collect KPIs when starting a new SLA. It can also provide custom data collection endpoints that are not used by any SLA. |
| Configuration Manager | Manages system parameters and micro-service configurations across the entire applications. It adopts the ATOMIX framework to distribute the configuration across different nodes. |
| Statistics Manager | Provides basic services for computing statistical functions on any data point. Can be attached to any KPIs dynamically using the provided REST API. It support mean, standard deviation (stddev), variance, percentile, median, minimum (min), maximum (max), cumulative sum, and sample count. |
| OVS Manager | Provides OVS management services and OVS termination endpoints. Includes APIs for creating, updating, and deleting OVS rules, creating VXLAN and GRE tunnels across different endpoints, allocating network services and supporting the basic network control operation of the framework. |
| SLA Manager | Compile the SLA request and decompose it in commands to create network sounding functions, data collection endpoints, notifications, and actions based on the SLA KPIs. Performs checks on SLA violations based on the collected data and on the SLA conditions specified in the SLA request. |

*FIG. 19*

1. Create OVS bridge (if not present)
2. Fetch network profile from nix gateway,   //json with network configuration details (gateway and control nodes)
3. Configure OVS bridge IP and macaddress using received network profile
4. Configure tunnel endpoints (from the local node OVS bridge to the OVS termination and vice versa)
5. Assign IPs to the tunnel endpoints
6. Create network service to connect local OVS switch to network controller nodes // SLA def. in the network profile
   a. Take the network control node IP(s) from the network configuration
   b. Start latency analysis on the network interfaces and collect the needed number of samples as specified in the network profile
   c. Program network control node service SLA with latency < threshold from network profile
   d. Deploy OVS rule by selecting the network with lowest latency (< threshold); protocol and IP and port are taken from the network profile
   e. Verify connection
      f.1. If verified:
         f.1.1 Attach the control node to the OVS switch if connection clears;
         f.1.2 Listen for new service requests
      f.2 Else
         f.2.1. Tear down the created service
         f.2.2. wait for pre-configured time
         f.2.3. restart from 6.

*FIG. 20*

1. Create OVS rule (protocol, port, IP) on the local node
2. Send an OVS rule creation (protocol, port ip) on the gateway node (if applicable)
3. Deploy OVS rules
4. Verify the connectivity to the gateway
   4.1. If verified:
      4.1.1 Send a message to the data collection endpoints that the service is ready
      4.1.2 Send Intent request to the network controller specifying source, destination, tunnel type, bandwidth and latency requirements
      4.1.3 verify the end to end connectivity
         4.1.3.1 if verified
            4.1.3.1.1 Start provisioning the service
         4.1.3.2 if not verified
            4.1.3.2.1 wait random time (max value in the node configuration
            4.1.3.2.2 repeat from 6.1.2
   4.2 Else
      4.2.1. Tear down the created service
      4.2.2. wait for pre-configured time
      4.2.3 restart from 1.

WIRELESS CONNECTIVITY FOR AUTONOMOUS DEVICES

TECHNICAL FIELD

Various example embodiments relate generally to communication systems and, more particularly but not exclusively, to supporting wireless connectivity for automated materials handling.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to receive, by an autonomous device configured to support a set of wireless access interfaces, a service level agreement associated with a network service to be supported by the autonomous device, identify, by the autonomous device based on the service level agreement, the network service, a set of key performance indicators associated with the network service, and a set of functions configured to collect key performance indicator data for the key performance indicators associated with the network service, obtain, by the autonomous device based on the set of functions, the key performance indicator data for the set of key performance indicators associated with the network service, and select, based on evaluation of the key performance indicator data, a selected one of the wireless access interfaces of the autonomous device to be used to support the network service. In at least some example embodiments, the network service, the set of key performance indicators associated with the network service, and the set of functions configured to collect key performance indicator data for the key performance indicators associated with the network service are determined based on compilation and decomposition of the service level agreement at the autonomous device. In at least some example embodiments, the set of instructions is configured to, when executed by the at least one processor, cause the apparatus to identify, by the autonomous device based on the service level agreement, a network configuration for a communication network configured to support communications of the autonomous device. In at least some example embodiments, the set of instructions is configured to, when executed by the at least one processor, cause the apparatus to send, by the autonomous device toward a controller of the communication network, an indication of the network configuration for the communication network. In at least some example embodiments, the network configuration for the communication network is configured to provide an initial allocation of the network service for the autonomous device based on a first one of the wireless access interfaces of the autonomous device. In at least some example embodiments, at least a portion of the key performance indicator data for the set of key performance indicators associated with the network service is obtained based on the initial allocation of the network service for the autonomous device. In at least some example embodiments, the set of instructions is configured to, when executed by the at least one processor, cause the apparatus to switch, at the autonomous device for the network service, from the first one of the wireless access interfaces of the autonomous device to the selected one of the wireless access interfaces of the autonomous device. In at least some example embodiments, the set of key performance indicators includes a key performance indicator supported by the autonomous device. In at least some example embodiments, the set of functions configured to collect key performance indicator data for the key performance indicators associated with the network service includes a data collection function configured to collect data for the key performance indicator supported by the autonomous device. In at least some example embodiments, the set of instructions is configured to, when executed by the at least one processor, cause the apparatus to send, by the autonomous device, a message for configuring the data collection function to collect the data for the key performance indicator supported by the autonomous device. In at least some example embodiments, the set of key performance indicators includes a key performance indicator unsupported by the autonomous device. In at least some example embodiments, the set of functions configured to collect key performance indicator data for the key performance indicators associated with the network service includes a sounding function configured to estimate data for the key performance indicator unsupported by the autonomous device. In at least some example embodiments, the set of instructions is configured to, when executed by the at least one processor, cause the apparatus to send, by the autonomous device, a message for configuring the sounding function to collect the data for the key performance indicator unsupported by the autonomous device. In at least some example embodiments, to select the selected one of the wireless access interfaces of the autonomous device to be used to support the network service, the set of instructions is configured to, when executed by the at least one processor, cause the apparatus to determine, by the autonomous device for each of the wireless access interfaces based on the key performance indicator data for the set of key performance indicators associated with the network service, whether the respective wireless access interface satisfies the service level agreement associated with the network service and select, by the autonomous device from ones of the wireless access interfaces determined to satisfy the service level agreement associated with the network service, the selected one of the wireless access interfaces of the autonomous device to be used to support the network service. In at least some example embodiments, to select the selected one of the wireless access interfaces of the autonomous device to be used to support the network service, the set of instructions is configured to, when executed by the at least one processor, cause the apparatus to compute, by the autonomous device based on the key performance indicator data for the set of key performance indicators associated with the network service, respective dimensionless scores for the respective wireless access interface and select, by the autonomous device based on the respective dimensionless scores for the respective wireless access interfaces, the selected one of the wireless access interfaces of the autonomous device to be used to support the network service. In at least some example embodiments, the set of instructions is configured to, when executed by the at least one processor, cause the apparatus to send, by the autonomous device based on the selected one of the wireless access interfaces of the autonomous device to be used to support the network service, a message configured to request configuration of a communication network to support use of the selected one of the wireless access interfaces of the autonomous device to support the network service. In at least some example embodiments, the set of wireless access interfaces includes at least one of a WiFi access interface or a cellular access interface. In at least some example embodiments, the autonomous device is an autonomous guided vehicle or a robot. In at least some example embodiments, the autonomous device is configured to operate within an automated materials handling environment.

In at least some example embodiments, a non-transitory computer-readable medium stores a set of instructions configured to cause an apparatus to receive, by an autonomous device configured to support a set of wireless access interfaces, a service level agreement associated with a network service to be supported by the autonomous device, identify, by the autonomous device based on the service level agreement, the network service, a set of key performance indicators associated with the network service, and a set of functions configured to collect key performance indicator data for the key performance indicators associated with the network service, obtain, by the autonomous device based on the set of functions, the key performance indicator data for the set of key performance indicators associated with the network service, and select, based on evaluation of the key performance indicator data, a selected one of the wireless access interfaces of the autonomous device to be used to support the network service. In at least some example embodiments, the network service, the set of key performance indicators associated with the network service, and the set of functions configured to collect key performance indicator data for the key performance indicators associated with the network service are determined based on compilation and decomposition of the service level agreement at the autonomous device. In at least some example embodiments, the set of instructions is configured to cause the apparatus to identify, by the autonomous device based on the service level agreement, a network configuration for a communication network configured to support communications of the autonomous device. In at least some example embodiments, the set of instructions is configured to cause the apparatus to send, by the autonomous device toward a controller of the communication network, an indication of the network configuration for the communication network. In at least some example embodiments, the network configuration for the communication network is configured to provide an initial allocation of the network service for the autonomous device based on a first one of the wireless access interfaces of the autonomous device. In at least some example embodiments, at least a portion of the key performance indicator data for the set of key performance indicators associated with the network service is obtained based on the initial allocation of the network service for the autonomous device. In at least some example embodiments, the set of instructions is configured to cause the apparatus to switch, at the autonomous device for the network service, from the first one of the wireless access interfaces of the autonomous device to the selected one of the wireless access interfaces of the autonomous device. In at least some example embodiments, the set of key performance indicators includes a key performance indicator supported by the autonomous device. In at least some example embodiments, the set of functions configured to collect key performance indicator data for the key performance indicators associated with the network service includes a data collection function configured to collect data for the key performance indicator supported by the autonomous device. In at least some example embodiments, the set of instructions is configured to cause the apparatus to send, by the autonomous device, a message for configuring the data collection function to collect the data for the key performance indicator supported by the autonomous device. In at least some example embodiments, the set of key performance indicators includes a key performance indicator unsupported by the autonomous device. In at least some example embodiments, the set of functions configured to collect key performance indicator data for the key performance indicators associated with the network service includes a sounding function configured to estimate data for the key performance indicator unsupported by the autonomous device. In at least some example embodiments, the set of instructions is configured to cause the apparatus to send, by the autonomous device, a message for configuring the sounding function to collect the data for the key performance indicator unsupported by the autonomous device. In at least some example embodiments, to select the selected one of the wireless access interfaces of the autonomous device to be used to support the network service, the set of instructions is configured to cause the apparatus to determine, by the autonomous device for each of the wireless access interfaces based on the key performance indicator data for the set of key performance indicators associated with the network service, whether the respective wireless access interface satisfies the service level agreement associated with the network service and select, by the autonomous device from ones of the wireless access interfaces determined to satisfy the service level agreement associated with the network service, the selected one of the wireless access interfaces of the autonomous device to be used to support the network service. In at least some example embodiments, to select the selected one of the wireless access interfaces of the autonomous device to be used to support the network service, the set of instructions is configured to cause the apparatus to compute, by the autonomous device based on the key performance indicator data for the set of key performance indicators associated with the network service, respective dimensionless scores for the respective wireless access interface and select, by the autonomous device based on the respective dimensionless scores for the respective wireless access interfaces, the selected one of the wireless access interfaces of the autonomous device to be used to support the network service. In at least some example embodiments, the set of instructions is configured to cause the apparatus to send, by the autonomous device based on the selected one of the wireless access interfaces of the autonomous device to be used to support the network service, a message configured to request configuration of a communication network to support use of the selected one of the wireless access interfaces of the autonomous device to support the network service. In at least some example embodiments, the set of wireless access interfaces includes at least one of a WiFi access interface or a cellular access interface. In at least some example embodiments, the autonomous device is an autonomous guided vehicle or a robot. In at least some example embodiments, the autonomous device is configured to operate within an automated materials handling environment.

In at least some example embodiments, a method includes receiving, by an autonomous device configured to support a set of wireless access interfaces, a service level agreement associated with a network service to be supported by the autonomous device, identifying, by the autonomous device based on the service level agreement, the network service, a set of key performance indicators associated with the network service, and a set of functions configured to collect key performance indicator data for the key performance indicators associated with the network service, obtaining, by the autonomous device based on the set of functions, the key performance indicator data for the set of key performance indicators associated with the network service, and selecting, based on evaluation of the key performance indicator data, a selected one of the wireless access interfaces of the autonomous device to be used to support the network service. In at least some example embodiments, the network service, the set of key performance indicators associated with the network service, and the set of functions configured to collect key performance indicator data for the key performance indicators associated with the network service are determined based on compilation and decomposition of the service level agreement at the autonomous device. In at least some example embodiments, the method includes identifying, by the autonomous device based on the service level agreement, a network configuration for a communication network configured to support communications of the autonomous device. In at least some example embodiments, the method includes sending, by the autonomous device toward a controller of the communication network, an indication of the network configuration for the communication network. In at least some example embodiments, the network configuration for the communication network is configured to provide an initial allocation of the network service for the autonomous device based on a first one of the wireless access interfaces of the autonomous device. In at least some example embodiments, at least a portion of the key performance indicator data for the set of key performance indicators associated with the network service is obtained based on the initial allocation of the network service for the autonomous device. In at least some example embodiments, the method includes switching, at the autonomous device for the network service, from the first one of the wireless access interfaces of the autonomous device to the selected one of the wireless access interfaces of the autonomous device. In at least some example embodiments, the set of key performance indicators includes a key performance indicator supported by the autonomous device. In at least some example embodiments, the set of functions configured to collect key performance indicator data for the key performance indicators associated with the network service includes a data collection function configured to collect data for the key performance indicator supported by the autonomous device. In at least some example embodiments, the method includes sending, by the autonomous device, a message for configuring the data collection function to collect the data for the key performance indicator supported by the autonomous device. In at least some example embodiments, the set of key performance indicators includes a key performance indicator unsupported by the autonomous device. In at least some example embodiments, the set of functions configured to collect key performance indicator data for the key performance indicators associated with the network service includes a sounding function configured to estimate data for the key performance indicator unsupported by the autonomous device. In at least some example embodiments, the method includes sending, by the autonomous device, a message for configuring the sounding function to collect the data for the key performance indicator unsupported by the autonomous device. In at least some example embodiments, selecting the selected one of the wireless access interfaces of the autonomous device to be used to support the network service includes determining, by the autonomous device for each of the wireless access interfaces based on the key performance indicator data for the set of key performance indicators associated with the network service, whether the respective wireless access interface satisfies the service level agreement associated with the network service and selecting, by the autonomous device from ones of the wireless access interfaces determined to satisfy the service level agreement associated with the network service, the selected one of the wireless access interfaces of the autonomous device to be used to support the network service. In at least some example embodiments, selecting the selected one of the wireless access interfaces of the autonomous device to be used to support the network service includes computing, by the autonomous device based on the key performance indicator data for the set of key performance indicators associated with the network service, respective dimensionless scores for the respective wireless access interface and selecting, by the autonomous device based on the respective dimensionless scores for the respective wireless access interfaces, the selected one of the wireless access interfaces of the autonomous device to be used to support the network service. In at least some example embodiments, the method includes sending, by the autonomous device based on the selected one of the wireless access interfaces of the autonomous device to be used to support the network service, a message configured to request configuration of a communication network to support use of the selected one of the wireless access interfaces of the autonomous device to support the network service. In at least some example embodiments, the set of wireless access interfaces includes at least one of a WiFi access interface or a cellular access interface. In at least some example embodiments, the autonomous device is an autonomous guided vehicle or a robot. In at least some example embodiments, the autonomous device is configured to operate within an automated materials handling environment.

In at least some example embodiments, an apparatus includes means for receiving, by an autonomous device configured to support a set of wireless access interfaces, a service level agreement associated with a network service to be supported by the autonomous device, means for identifying, by the autonomous device based on the service level agreement, the network service, a set of key performance indicators associated with the network service, and a set of functions configured to collect key performance indicator data for the key performance indicators associated with the network service, means for obtaining, by the autonomous device based on the set of functions, the key performance indicator data for the set of key performance indicators associated with the network service, and means for selecting, based on evaluation of the key performance indicator data, a selected one of the wireless access interfaces of the autonomous device to be used to support the network service. In at least some example embodiments, the network service, the set of key performance indicators associated with the network service, and the set of functions configured to collect key performance indicator data for the key performance indicators associated with the network service are determined based on compilation and decomposition of the service level agreement at the autonomous device. In at least some example embodiments, the apparatus includes means for identifying, by the autonomous device based on the service level agreement, a network configuration for a communication network configured to support communications of the autonomous device. In at least some example embodiments, the apparatus includes means for sending, by the autonomous device toward a controller of the communication network, an indication of the network configuration for the communication network. In at least some example embodiments, the network configuration for the communication network is configured to provide an initial allocation of the network service for the autonomous device based on a first one of the wireless access interfaces of the autonomous device. In at least some example embodiments, at least a portion of the key performance indicator data for the set of key performance indicators associated with the network service is obtained based on the initial allocation of the network service for the autonomous device. In at least some example embodiments, the apparatus includes means for switching, at the autonomous device for the network service, from the first one of the wireless access interfaces of the autonomous device to the selected one of the wireless access interfaces of the autonomous device. In at least some example embodiments, the set of key performance indicators includes a key performance indicator supported by the autonomous device. In at least some example embodiments, the set of functions configured to collect key performance indicator data for the key performance indicators associated with the network service includes a data collection function configured to collect data for the key performance indicator supported by the autonomous device. In at least some example embodiments, the apparatus includes means for sending, by the autonomous device, a message for configuring the data collection function to collect the data for the key performance indicator supported by the autonomous device. In at least some example embodiments, the set of key performance indicators includes a key performance indicator unsupported by the autonomous device. In at least some example embodiments, the set of functions configured to collect key performance indicator data for the key performance indicators associated with the network service includes a sounding function configured to estimate data for the key performance indicator unsupported by the autonomous device. In at least some example embodiments, the apparatus includes means for sending, by the autonomous device, a message for configuring the sounding function to collect the data for the key performance indicator unsupported by the autonomous device. In at least some example embodiments, the means for selecting the selected one of the wireless access interfaces of the autonomous device to be used to support the network service includes means for determining, by the autonomous device for each of the wireless access interfaces based on the key performance indicator data for the set of key performance indicators associated with the network service, whether the respective wireless access interface satisfies the service level agreement associated with the network service and means for selecting, by the autonomous device from ones of the wireless access interfaces determined to satisfy the service level agreement associated with the network service, the selected one of the wireless access interfaces of the autonomous device to be used to support the network service. In at least some example embodiments, the means for selecting the selected one of the wireless access interfaces of the autonomous device to be used to support the network service includes means for computing, by the autonomous device based on the key performance indicator data for the set of key performance indicators associated with the network service, respective dimensionless scores for the respective wireless access interface and means for selecting, by the autonomous device based on the respective dimensionless scores for the respective wireless access interfaces, the selected one of the wireless access interfaces of the autonomous device to be used to support the network service. In at least some example embodiments, the apparatus includes means for sending, by the autonomous device based on the selected one of the wireless access interfaces of the autonomous device to be used to support the network service, a message configured to request configuration of a communication network to support use of the selected one of the wireless access interfaces of the autonomous device to support the network service. In at least some example embodiments, the set of wireless access interfaces includes at least one of a WiFi access interface or a cellular access interface. In at least some example embodiments, the autonomous device is an autonomous guided vehicle or a robot. In at least some example embodiments, the autonomous device is configured to operate within an automated materials handling environment.

In at least some example embodiments, an apparatus includes at least one processor and at least one memory including a set of instructions, wherein the set of instructions is configured to, when executed by the at least one processor, cause the apparatus to send, by a controller associated with a communication network toward an autonomous device, a service level agreement associated with a network service to be supported by the autonomous device based on a set of wireless access interfaces of the autonomous device, receive, by the controller from the autonomous device, an indication of a first network configuration for the communication network to support the network service at the autonomous device, and receive, by the controller from the autonomous device, an indication of a second network configuration for the communication network to support the network service at the autonomous device based on a selected one of the wireless access interfaces of the autonomous device. In at least some example embodiments, a non-transitory computer-readable medium stores a set of instructions configured to cause an apparatus to send, by a controller associated with a communication network toward an autonomous device, a service level agreement associated with a network service to be supported by the autonomous device based on a set of wireless access interfaces of the autonomous device, receive, by the controller from the autonomous device, an indication of a first network configuration for the communication network to support the network service at the autonomous device, and receive, by the controller from the autonomous device, an indication of a second network configuration for the communication network to support the network service at the autonomous device based on a selected one of the wireless access interfaces of the autonomous device. In at least some example embodiments, a method includes sending, by a controller associated with a communication network toward an autonomous device, a service level agreement associated with a network service to be supported by the autonomous device based on a set of wireless access interfaces of the autonomous device, receiving, by the controller from the autonomous device, an indication of a first network configuration for the communication network to support the network service at the autonomous device, and receiving, by the controller from the autonomous device, an indication of a second network configuration for the communication network to support the network service at the autonomous device based on a selected one of the wireless access interfaces of the autonomous device. In at least some example embodiments, an apparatus includes means for sending, by a controller associated with a communication network toward an autonomous device, a service level agreement associated with a network service to be supported by the autonomous device based on a set of wireless access interfaces of the autonomous device, means for receiving, by the controller from the autonomous device, an indication of a first network configuration for the communication network to support the network service at the autonomous device, and means for receiving, by the controller from the autonomous device, an indication of a second network configuration for the communication network to support the network service at the autonomous device based on a selected one of the wireless access interfaces of the autonomous device.

BRIEF DESCRIPTION OF THE DRAWINGS

The teachings herein can be readily understood by considering the following detailed description in conjunction with the accompanying drawings, in which:

FIG. 3 depicts an example embodiment of a network service allocation request for an AMH device in an AMH environment;

FIG. 4 depicts an example embodiment of a request for creating a network latency sounding function;

FIG. 7 depicts an example embodiment of a list of Kafka topics for a broker of the system architecture of FIG. 6;

FIGS. 8A and 8B depict an example embodiment of a list of microservices for the system architecture of FIG. 6;

FIG. 9 depicts an example embodiment of a request for the creation of a REST notification in the system architecture of FIG. 6;

FIG. 19 depicts an example embodiment of an Open vSwitch (OVS) network startup algorithm for supporting configuration of a communication network to support communications of a network service supported by an AMH device;

FIG. 20 depicts an example embodiment of a service allocation algorithm for supporting configuration of a communication network to support communications of a network service supported by an AMH device;

To facilitate understanding, identical reference numerals have been used herein, wherever possible, in order to designate identical elements that are common among the various figures.

DETAILED DESCRIPTION

Various example embodiments for supporting wireless connectivity for automated materials handling (AMH) are presented. Various example embodiments for supporting wireless connectivity for AMH may be configured to support wireless connectivity for AMH devices in an AMH environment (e.g., factory floor, mining environment, or the like). Various example embodiments for supporting wireless connectivity for AMH devices in an AMH environment may be configured to ensure that the AMH devices can maintain reliable connectivity to and communication with a network of the AMH environment. It will be appreciated that, although primarily presented with respect to supporting wireless connectivity for AMH devices in an AMH environment, various example embodiments presented herein may be applied for supporting wireless connectivity for various other types of devices, for supporting wireless connectivity for devices in various other types of environments, or the like, as well as various combinations thereof. It will be appreciated that these and various other example embodiments and associated advantages or potential advantages of supporting wireless connectivity for AMH may be further understood by way of reference to the various figures, which are discussed further below.

Figure 1:
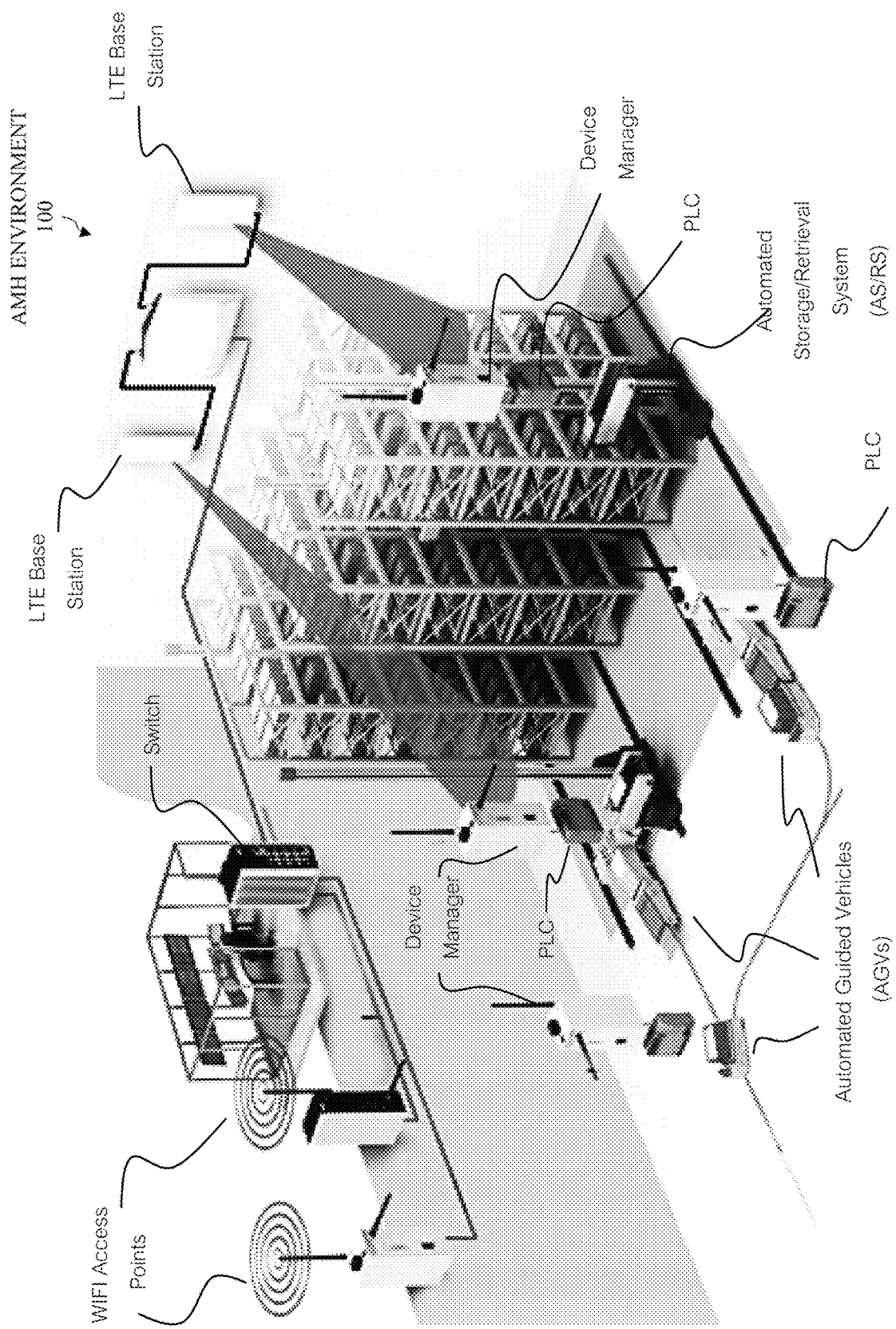
FIG. 1 depicts an example embodiment of an automated materials handling environment configured to support automated materials handling.

FIG. 1 depicts an example embodiment of an automated materials handling (AMH) environment configured to support automated materials handling. The AMH environment 100 is a factory floor adopting AMH. The AMH environment 100 includes materials handling infrastructure (e.g., shelving, material lift and placement infrastructure, conveyor belts, or the like), an automated storage/retrieval system for automated storage of materials in the materials handling infrastructure and retrieval of materials from the materials handling infrastructure (e.g., material lift and placement infrastructure, conveyor belts, or the like), AMH devices (e.g., automated guided vehicles (AGVs) configured to support handling of materials (e.g., forklifts, cranes, or the like), robots, or various other types of autonomous devices which may operate within an AMH environment), communication infrastructure (e.g., wireless access points such as WiFi or cellular wireless access points, switches, routers, and so forth) configured to support communications between various elements (e.g., between AGVs, between AGVs and services or applications, or the like), or the like, as well as various combinations thereof. It will be appreciated that various example embodiments for supporting wireless connectivity for AMH may be further understood by first considering various aspects of AMH more generally, as discussed further below.

AMH refers to automation of loading, moving, and unloading of materials used by a production unit. The main objectives of AMH systems are reducing the cost of operation, minimizing human errors by using automation, and meeting safety requirements in factories and warehouses, among others. Example of AMH devices are automated guided vehicles (AGVs), automated conveyors, automated cranes, automated storage and retrieval systems (AS/RS), clean room transport and storage systems, and so forth.

AGV are battery powered driverless vehicle that can be programmed with positioning and path selection capabilities. The AGVs can follow markers or wires on the floor, or use sensors, magnets, or lasers for navigation. They are often used in industrial applications to move materials around a manufacturing facility or warehouse. Benefits include reduced labor and operational costs in distribution and supply chain applications in warehouses. AGVs are commonly adopted in logistics and manufactory to deliver parts to the assembly line in a just-in-time fashion. In performing this task, AGVs have to navigate throughout the factory floor and often operate in situations of low network quality, network overload due to other AGVs connected to the same access point, interference caused by metallic obstacles in the line of sights of access points, and so forth.

In the AMH context, AGVs generally are considered to be "mission critical" and are expected to operate wirelessly with the central computer to carry out their delivery instructions. If any of the AGVs loses communications with the central computer, the AGV usually is designed to stop until the problem can be resolved. Depending on the type of communication failure, the AGV could only be restarted in one of two ways: (1) an automatic reboot of its on-board computer (e.g., which may take approximately 5 minutes or longer), or (2) through manual intervention (e.g., which may take approximately 20 minutes or longer). These "communication failures" and related AGV downtimes are unacceptable as they severely impact the operation of the AMH environment (e.g., an auto manufacturer's ability to build a product, a product shipping company's ability to deliver products to customers on time, and so forth).

In the AMH context, uninterrupted data communication is an important prerequisite for implementing operation technology (OT) grade private wireless connectivity. The main challenge is that in AMH environments, such as warehouses and factories, quality network connections can be hard to come by, not only because cabling for a wired network takes strenuous efforts, but also because the stability of a wireless network can be undermined by industrial machines, moving parts, and stockpiled inventory obstructing wireless signals. This problem may be even more critical for industry verticals adopting AMR Various example embodiments for supporting wireless connectivity for AMH may be configured to ensure reliable communication of AMH devices in an AMH environment to the network infrastructure deployed in the AMH environment. Each of the AMH devices in the AMH environment may have widely varying connectivity needs which may be expressed in SLAs for the AMH devices, respectively. The SLA for an AMH device may change over time depending on various factors, such as the task(s) or subtask(s) performed by the AMH device, the position of the AMH device, the availability of access technology (e.g., WiFi, private/public cellular such as LTE or 5G, Multefire, or the like) in the area of the AMH device, coordination of needs of the AMH device with one or more other AMH devices, the status of the network, or the like, as well as various combinations thereof.

Various example embodiments for supporting wireless connectivity for AMH may be configured to ensure reliable communication of AMH devices in an AMH environment to the network infrastructure deployed in the AMH environment by ensuring that the AMH devices can roam smoothly between access points and access technologies with minimal handover time. Various example embodiments for supporting wireless connectivity for AMH may be configured to, given the availability of different wireless access technologies (e.g., WiFi, LTE, 5G, or the like) available to an AMH device in the AMH environment, select and connect the best access network to the AMH device that is able to meet the specific mission or use-case SLA (e.g., bandwidth, latency, jitter, resiliency, availability, reliability and security and any other mission-specific KPI) of the AMH device. Various example embodiments for supporting wireless connectivity for AMH may provide a programmable framework (referred to herein as NiX) that is configured to enable KPI-driven network control of network services by enabling concurrent use of multiple access interfaces (e.g., LTE and WiFi at same time), each one serving one or more specific network services (e.g., camera feed and telemetry from an AGH) depending on the delivered quality of service, KPIs, and capability of the access network (e.g., latency and bandwidth toward specific endpoints).

Various example embodiments for supporting wireless connectivity for AMH may be configured to ensure reliable communication of AMH devices in an AMH environment to the network infrastructure deployed in the AMH environment by supporting various capabilities configured to provide various functions supporting reliable communication of AMH devices in an AMH environment to the network infrastructure deployed in the AMH environment. For example, various example embodiments may be configured to provide a programmable agent running locally on the AMH device that is capable of compiling the SLA requirements (in high-level and system-agnostic format) into specific network-level KPIs and logical predicates. SLA requirements can be expressed dynamically, without the need for reprogramming or halting of the AMH devices, in a network agnostic fashion, in terms of predicates evaluated on a set of KPIs of interests. An example of SLA formulation is: (1) $95^{th}$ percentile of network latency towards a network gateway less than 20 ms, (2) $95^{th}$ percentile of the available bandwidth always greater than 10 Mbit/s, (3) 5 nines of reliability. For example, various example embodiments may be configured to provide a programmable agent running locally on the AMH device that is capable of measuring KPIs needed to verify the compiled SLA predicate. For example, various example embodiments may be configured to provide a data collection endpoint manager that is capable of creating dynamic data collection endpoints (probes) for collecting the KPIs needed to evaluate the compiled SLA. For example, various example embodiments may be configured to provide a data-driven automation routing agent that is able to program automations in case the collected KPIs are within selected thresholds, and to route data to/from public cloud infrastructure, including cloud services. For example, various example embodiments may be configured to provide centralized software running in edge cloud servers for collecting data needed to validate the compiled SLA and for monitoring the AMH devices. For example, various example embodiments may be configured to provide network control software running on the AMH device that identifies the best available access network (e.g., different WiFi Access Points sensed by the AMH device, cellular connections such as LIE and 5G connections, or the like) that the AMH device should handoff to and that is able to meet the compiled SLA. For example, various example embodiments may be configured to provide a scoring function and related algorithm used to compute a single dimensionless number to rank each access network available to the AMH device (e.g., WiFi, LTE, 5G, or the like) with respect to the compiled SLA. For example, various example embodiments may be configured to provide a network switching actuator able to orchestrate the switching of network flows dynamically with respect to the access interface selected based on the scoring function. For example, various example embodiments may be configured to provide a centralized network resource management framework that provides a global view of the network and performs network-level resource optimization to avoid network overload and optimize network resource usage. For example, various example embodiments may be configured to provide a time series database able to store the measured data to support post-mortem analysis and business intelligence. For example, various example embodiments may be configured to provide web-based dashboard configured to provide visualization of various aspects of supporting wireless connectivity for AMH (e.g., visualization of KPIs collected to validate the predicates in the compiled SLAs and so forth). Various example embodiments for supporting wireless connectivity for AMH may be configured to ensure reliable communication of AMH devices in an AMH environment to the network infrastructure deployed in the AMH environment by supporting various other capabilities configured to provide various functions supporting reliable communication of AMH devices in an AMH environment to the network infrastructure deployed in the AMH environment.

Figure 2:
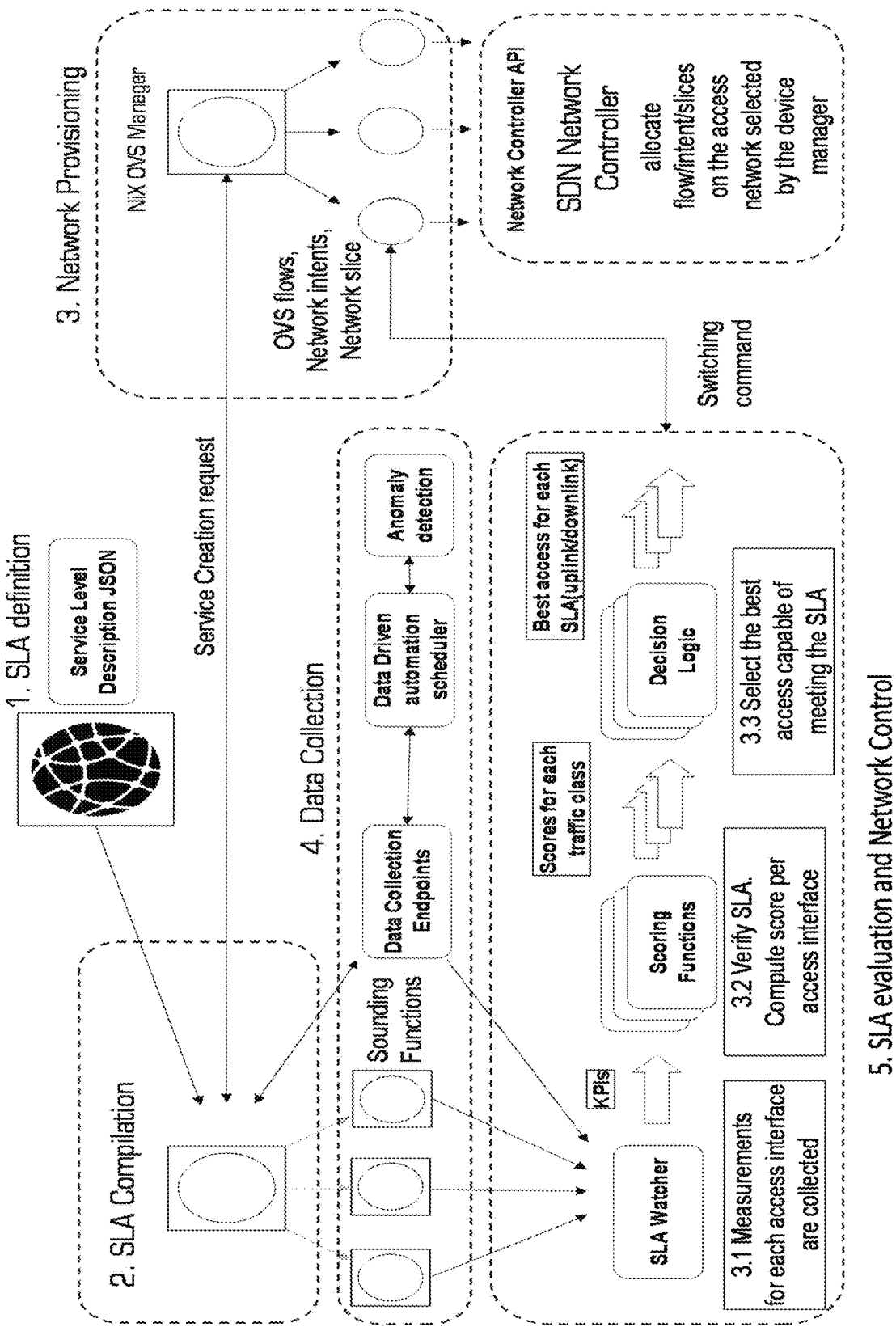
FIG. 2 depicts an example embodiment of a process configured to support wireless connectivity for AMH devices in an AMH environment.

FIG. 2 depicts an example embodiment of a process configured to support wireless connectivity for AMH devices in an AMH environment.

In the process of FIG. 2, the first step is that an SLA is provided. The SLA may be provided by a controller to the AMH device at which the SLA is to be supported. The SLA may be a service level description for a set of network services to be supported by the AMH device. The SLA may be provided in the form of an SLA request. An example of an SLA creation request is depicted in FIG. 3. The SLA includes one or more KPIs and associated logical conditions to be met (e.g., network latency toward a specific node <20 ms for a low-latency network service AND network capacity >20 Mbit for a high-capacity network service).

In the process of FIG. 2, the second step is that the SLA is compiled and decomposed. The SLA may be compiled and decomposed by the AMH device. The outputs of the compiling and decomposing of the SLA include a list of network services to be allocated, a list of KPIs to be collected, and a set of sounding functions to be executed in order to estimate any KPIs that are not currently generated by the system.

The outputs of the compiling and decomposing of the SLA, as indicated above, include a list of network services to be allocated. The list of network services to be allocated may be specified in terms of source IP address and port, destination IP address and port, and protocol used (e.g., TCP or UDP). The list of network services may be sent to the NiX adapter that will translate the network service request for the network controller used in the setup by invoking the right network controller APIs to establish the services. An example request sent to the network service manager for creating a new network service is shown in FIG. 3.

The outputs of the compiling and decomposing of the SLA, as indicated above, include a list of KPIs to be collected. The list of KPIs to be collected may include, for each KPI to be collected, a collection frequency, a number of samples per measurement cycle, and statistical functions (e.g., mean, $95^{th}$ percentile, or the like) to be computed for the KPI. The output also may include a set of commands to create one or more on-demand data collection endpoints according to the KPIs and specified conditions. The output of this step is sent to a microservice that manages the data collection endpoints and that is responsible for the lifecycle of the data collection endpoints.

The outputs of the compiling and decomposing of the SLA, as indicated above, include a set of sounding functions to be executed in order to estimate any KPIs that are not currently generated by the system (e.g., network latency toward a specific destination). The list of sounding functions may be sent to a network sounding microservice that is in charge of programming the network sounding functions and scheduling execution of the network sounding functions. An example request for creating a network latency sounding function is depicted in FIG. 4.

It will be appreciated that, although primarily presented with respect to generation of specific outputs based the compiling and decomposing of the SLA and use of the outputs of the compiling and decomposing of the SLA in specific ways, various other outputs may be generated based the compiling and decomposing of the SLA, the outputs of the compiling and decomposing of the SLA may be used in various other ways, or the like, as well as various combinations thereof.

In the process of FIG. 2, the third step is that network service pre-allocation is performed. The compiled SLA specifies the destination IP/port and protocol for the network service. That information is extracted and passed to the Open vSwitch (OVS) manager, which in turn translates the request into low-level OVS commands for programming the OVS switch and mapping the network service to one of the available wireless access interfaces of the AMH device. Given that different access networks might have different IPs and network configurations, the OVS manager creates an overlay network between the source and destination of the requested network service using one or more tunnels (e.g., using Virtual Extensible Local Area Network (VXLAN) tunnels or other suitable types of tunnels). The OVS switch is programmed and an OVS tunnel is established if not already present. The network service will be provisioned in the fifth step, discussed below, after a suitable access network is identified with respect to the requested SLA.

In the process of FIG. 2, the fourth step is that data collection is performed. The data collection is performed for purposes of collecting data for use in evaluating the network access interfaces of the AMH device for selecting one of the network access interfaces of the AMH device to be used by the AMH device for the network service. After creating the OVS rules for allocating the network service, the framework starts to collect the KPIs from the data collection endpoints and the sounding functions, respectively. There are a number of different microservices which may be used to handle this task. The common objective is to enable a fully programmable data-collection layer where each collected KPI can be fed to any microservice, including the action scheduler, the anomaly detection manager, the anomaly prediction manager, and the data routing manager. The action scheduler can program specific actions (e.g., failover, alerting, reporting, or the like) programmed on i) specific KPI threshold, ii) time intervals and/or specific date, iii) anomalies in the time series of the collected KPIs, and/or iv) predicted anomalies, e.g., anomalies that likely will happen in the next epochs. Actions may include invocation of any REST method (e.g., POST, DELETE, PUT, PATCH, or the like, where it will be appreciated that a body reporting the triggering action can be included if requested, any topic (e.g., based on Message Queuing Telemetry Transport (MQTT), AMQ, Kafka, or the like), WebSocket messages, or the like, as well as various combinations thereof.

In the process of FIG. 2, the fifth step is that SLA evaluation and decision making is performed. The SLA is evaluated based on the collected data to select the wireless access interface of the AMH device that is to be used by the AMH device for the network service. This may include evaluation (and scoring) of each of the wireless access interfaces available at the AMH device, based on the collected data, to select the wireless access interface of the AMH device that is to be used by the AMH device for the network service. The collected data may be sent to the SLA watcher to evaluate the SLA predicate for each wireless access interface of the AMH device that is to be evaluated for supporting the network service. Given that SLAs can include conditions that span across different KPI (e.g., mean(latency on 1 min samples, 200 ms sampling)<20 ms AND percentile(bandwidth, $95^{th}$, 5 min samples, 250 ms sampling)>20 Mbit/s, as in the example of FIG. 4), the number that is used to evaluate each of the wireless access interfaces may be a number that is able to provide a dimensionless score that captures how well each available wireless access interface can serve the SLA for the network service. The intuition of the scoring function is to create a dynamic rank list of available wireless access interfaces of the AMH device. The scoring function may be computed for each of the available wireless access interfaces of the AMH device computed only if all the SLA conditions on the specified KPIs are met. The decision logic can be later implemented with respect to the rank list, for instance, selecting the wireless access interface listed in the first position of the rank list as the most appropriate wireless access interface for provisioning the network service specified by the SLA.

It is noted that, once the wireless access interface of the AMH device that is to be used for the network service is selected, a command is sent to the AMH device (e.g., to a network manager on the AMH device) for requesting a reallocation of the network service to the selected wireless access interface of the AMH device.

It is further noted that, once the wireless access interface of the AMH device that is to be used for the network service is selected, the wireless access interface of the AMH device that is used for the network service may be modified at any time (e.g., from cellular to WiFi, from WiFi to cellular, or the like). The wireless access interface of the AMH device that is used for the network service may be modified based on various conditions which may be detected at the AMH, within the network supporting the AMH, or the like, as well as various combinations thereof. For example, The wireless access interface of the AMH device that is used for the network service may be modified based on a change in the SLA of the network service, a change in KPI data collected for the wireless access interface of the AMH device currently supporting the network service (e.g., such that the KPI or an associated SLA condition is no longer satisfied), a change in KPI data collected for the one or more wireless access interfaces of the AMH that are not currently supporting the network service but which may become better suited for handling the network service than the wireless access interface of the AMH device currently supporting the network service (e.g., based on updated scoring of the wireless access interfaces of the AMH for the network service), or the like, as well as various combinations thereof. The anomaly detection manager can attach the supported anomaly detection algorithms to any of the collected KPIs. The anomaly prediction manager can attach anomaly prediction algorithms to any collected KPIs using supported algorithms. The anomaly detection algorithm can detect anomalies in the specified KPIs associated to a given network service and can request the network controller to allocate the given network service to another access network (e.g., from WIFI to LTE) upon detecting anomalies on the associated KPIs. The data-routing manager can forward any KPI to any supported to any supported action protocol (i.e., REST, MQTT, Kafka, AMQ, WebSocket, or the like). The framework also includes drivers for forwarding KPIs to public cloud providers (e.g., using MQTT over Transport Layer Security (TLS) or over WebSocket data, or the like).

Figure 5:
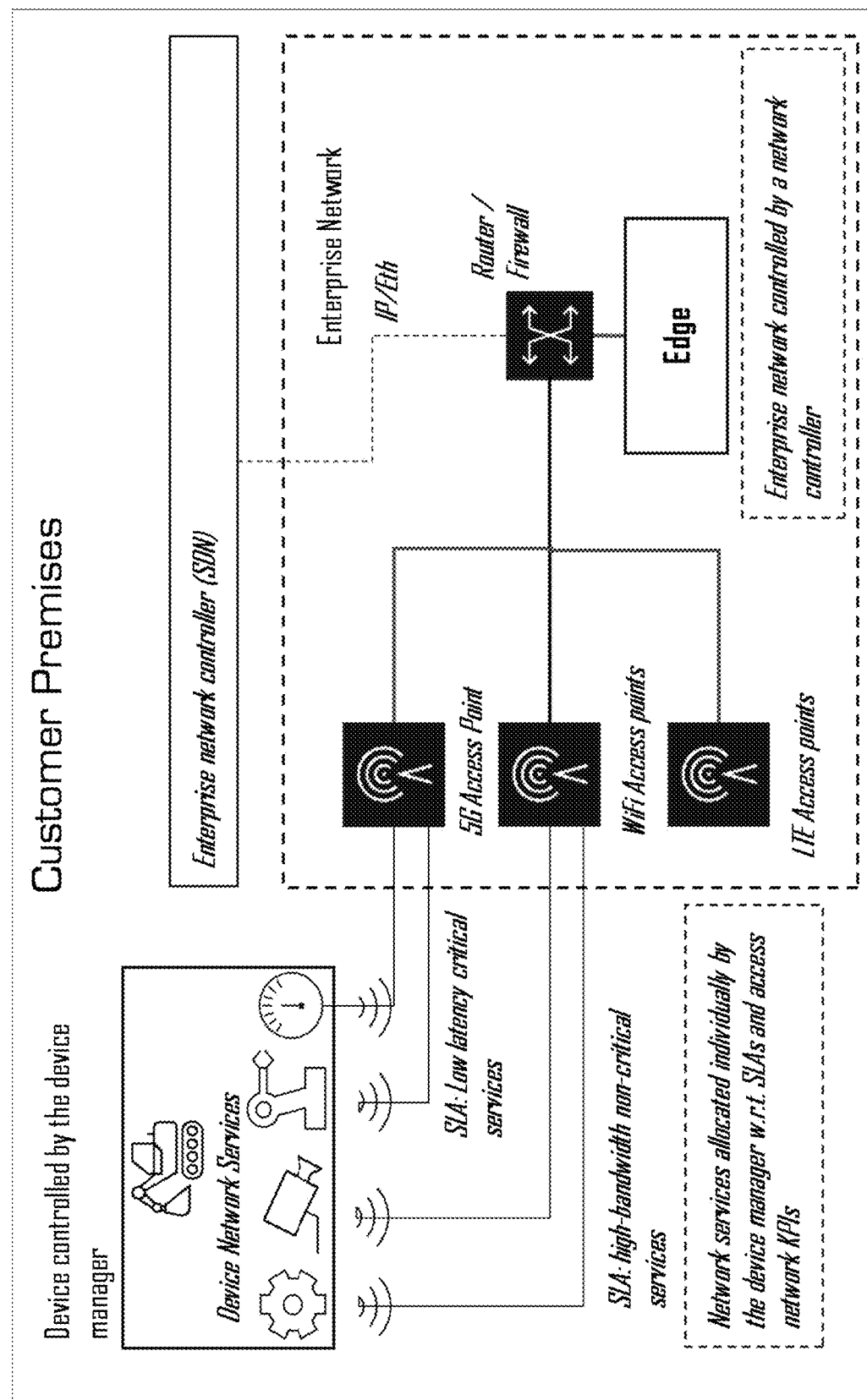
FIG. 5 depicts an example embodiment of network connectivity configured to support wireless connectivity for an AMH device in an AMH environment.

FIG. 5 depicts an example embodiment of network connectivity configured to support wireless connectivity for an AMH device in an AMH environment. As may be seen from FIG. 5, the main network control actions performed to connect a given network service (e.g., camera, telemetry, or the like) needed by an AMH device may include (1) the selection of the wireless access interface for each network service on the AMH device (e.g., performed by the framework by matching network service requirements (e.g., the SLA) with KPIs delivered by each access network (e.g., latency and bandwidth) as discussed above and further below and (2) control of the network (e.g., core) between the access point and the final destination of the network service (e.g., performed by the enterprise SDN network controller (e.g., ONOS, NetUNIX, or the like).

Figure 6:
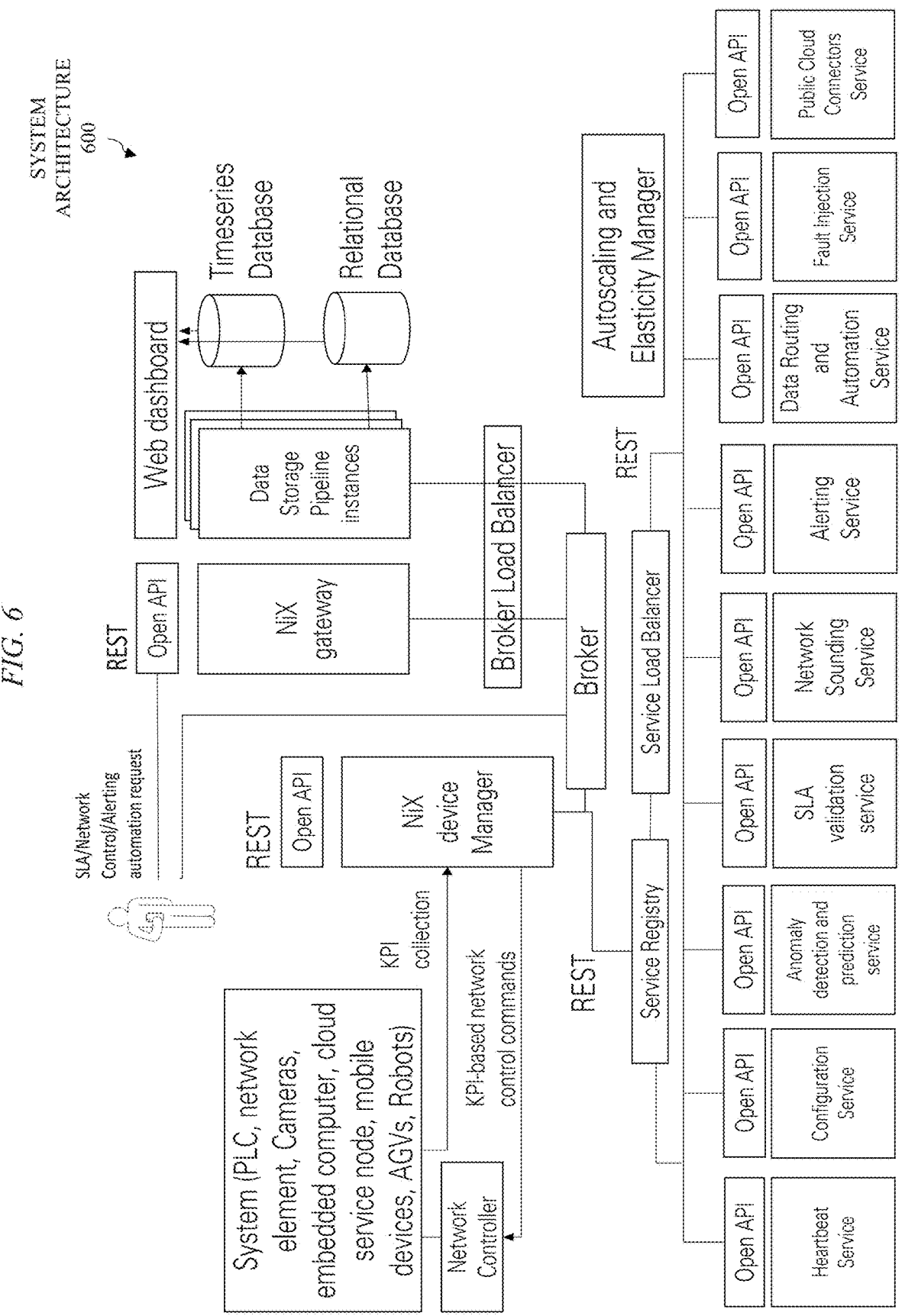
FIG. 6 depicts an example embodiment of a system architecture configured to support wireless connectivity for AMH devices in an AMH environment.

FIG. 6 depicts an example embodiment of a system architecture configured to support wireless connectivity for AMH devices in an AMH environment. The system architecture 600 is based on a micro-service architecture in which the services are spread across different nodes and connected through REST APIs.

The system architecture 600 includes a system (denoted as System) that is managed by a dedicated device manager (denoted as NiX device manager), a gateway (denoted as NiX gateway), a broker (denoted as Broker), a set of micro-services (denoted as NiX micro-services), and various other elements.

The system may include PLC-controlled devices (e.g., conveyor belts and other factory automation machinery), network elements (e.g., infrastructure network elements such as service routers, access points, photonic switches, and so forth), cameras, embedded computers, cloud service nodes, mobile devices, AGVs, robots, or the like, as well as various combinations thereof). The device manager may support a variety of data collection protocols (e.g., REST, Kafka, AMQ, Robotic Operating System (ROS) topic, AWS IoT core (MQTT over TLS), MQTT, Google Network Management Interface (gNMI) (for telemetry streaming from network elements), or the like, as well as various combinations thereof) and can run with agility on embedded hardware (e.g., IoT gateways and embedded computers) due to its micro-service and elastic design.

The device manager may be configured to support various functions for supporting wireless connectivity for elements of the system. For example, the device manager may be configured to enable data collection endpoints, collect data from the system and send data to a data broker, compile SLAs locally and program the micro-services for evaluating the SLA conditions, run local network and system sounding functions, manage network connection on the managed system, perform periodic tasks (e.g., timers) and data-driven events (e.g., actions based on KPI-based predicates), or the like, as well as various combinations thereof. The device manager is designed to offload the mentioned tasks to the micro-services running in the cloud. To guarantee smooth operations, even in case of disconnections and network outages, micro-services implementing various tasks supported by device manager can be deployed locally on the device manager. The device manager may be configured to support various other functions for supporting wireless connectivity for elements of the system.

The gateway is configured to manage the device manager (or several device managers) to provide centralized access to various elements, such as the latest KPIs, network interface counters, system counters, allocated SLAs, or the like, as well as various combinations thereof. The gateway may be configured to perform monitoring of connected device manager instances of the device manager, keep track of the current status of the device manager instances of the device manager (e.g., by storing relevant data on the end point enabled, SLA active, sounding functions and other device manager active services on the relational database), enabling server-side network sounding that may include one way ping and network capacity measurements between the managed device managers and itself, host OVS terminations, or the like, as well as various combinations thereof.

The broker is used for delivering collected KPIs for storage and analysis. The broker may be implemented using Kafka for its scalability, fault tolerance, low latency, and so forth. The framework may include a customized Kafka client that enables bridging Kafka with other supported brokers (MQTT and AMQ). The customized client also includes features for creating consumers (as on-demand Java Spring boot containers managed by the framework) and producers on demand with variable topics. A list of Kafka topics is presented in FIG. 7.

The Kafka topics, as depicted in FIG. 7, include a KPI topic (denoted as nix.kpi) which is the KPI collected. This may use the Influx line protocol format.

The Kafka topics, as depicted in FIG. 7, include an automation trigger (denoted as nix.automation.trigger) which is the trigger sent over Kafka. This can start specific actions if a correspondent listener is programmed by the device manager.

The Kafka topics, as depicted in FIG. 7, include custom name topic for a data collection endpoint (denoted as nix.endpoint.$CUSTOM_NAME) which is a topic created on demand when creating a new data collection endpoint over Kafka. It runs in dedicated containers that are managed by the device manager on demand through the customized Kafka client. It is used to forward data from any other source (REST, WebSocket, public cloud specific protocols, MQTT, AMQ, or the like) if programmed to do so by the endpoint manager service.

The Kafka topics, as depicted in FIG. 7, include a heartbeat topic (denoted as nix.heartbeat) which includes heartbeat signals from managed devices. It includes a JSON with the name of the heartbeat and duration from the last heartbeat.

The Kafka topics, as depicted in FIG. 7, include a custom table command topic (denoted as nix.mysql.$CUSTOM_TABLE.$COMMAND) which is a bridge topic for one-way interaction with the mysql database without needing to import the library at the client side (device manager) and perform queries. This may Require JSON with the same fields as the column in the mysql table specified in $CUSTOM_TABLE, with $COMMAND in the topic, including insert, update, delete.

The micro-services are configured to provide various functions within the system architecture. The micro-services may be based on a cloud native micro-service-based architecture. The language chosen for the implementation is Java; however, it will be appreciated that other languages may be used. The baseline micro-service platform adopted to develop the micro-service architecture is Spring boot; however, it will be appreciated that other baseline micro-service platforms may be used. The micro-services each may be configured to implement the OpenAPI Specification (OAS) to provide a standard, language-agnostic interface to RESTful APIs, thereby allowing both humans and computers to discover and understand the capabilities of the respective services without access to source code, documentation, or through network traffic inspection. The OAS implementation also provides the additional benefit of displaying the API that can be feed to code generation tools to generate test cases, use cases, servers and clients in various programming languages. As illustrated in FIG. 6 and FIGS. 8A and 8B, the micro-services may include a network sounding manager, a data-driven automation manager, an anomaly detection manager, a data routing and public cloud connector manager, a heartbeat manager, an alerting manager, a fault injection manager, a data collection endpoint creation manager, a configuration manager, a statistics manager, an OVS manager, and an SLA manager. It will be appreciated that fewer or more micro-services may be supported.

The network sounding manager creates, schedules, and manages the network sounding functions. Supported sounding functions may include one or more of two-way ping, one-way ping, uplink and downlink bandwidth measurements between two endpoints, system load (e.g., processor, memory, and disk performance counters), network performance counters, Java virtual machine (JVM) performance counters, or the like, as well as various combinations thereof. The implementation is system agnostic and it is based on a hardware abstraction layer library that is portable across different platform for fetching hardware/platform dependent performance counters. One-way ping may be based on a one-way ping framework (e.g., One-Way Active Measurement Protocol (OWAMP) or the like). Bandwidth estimation may be carried out by integrating the framework with Iperf3. A server is created on the gateway upon receipt of a request of network bandwidth sounding from a device manager. The device gateway assigns the ports to the server and launches a dedicated iperf3 server. For downlink traffic, the iperf3 reverse mode is used, i.e., traffic is sent from the gateway to the device manager. Iperf3 bandwidth measurement flows are scheduled on lower priority using the UNIX TC stack and can run on demand. Two way ping uses Internet Control Message Protocol (ICMP) ping commands between two endpoints. It will be appreciated that various other sounding functions may be supporting for collecting these or various other measurements or estimates of KPIs.

The data-driven automation manager creates, schedules, and manages events mapped to value ranges of the collected KPIs. Events may include internal notification through the internal notification bus, or actions. Actions may include trigger of other events, REST calls, MQTT/Kafka/AMQ/ROS topics, cloud IoT core events through MQTT over TLS connections, cloud notifications, WebSockets, or the like, as well as various combinations thereof. Input data can be collected through these various channels from all the collected KPIs and performance counters, as well as through gNMI interfaces for supporting streaming telemetry.

The anomaly detection manager provides a pipeline for attaching anomaly detection algorithms to any data collected. At this stage the random cut forest algorithm may be supported. The service includes an interface for easy addition of any other anomaly detection algorithm(s).

The data routing and public cloud connector manager may manage connectors which enable creation of data forwarding policies from any supported data input channel (e.g., trigger of other events, REST calls, MQTT/Kafka/AMQ/ROS topics, cloud IoT core events through MQTT over TLS connections, gNMI, WebSockets, or the like) to any supported data output channel (e.g., trigger of other events, REST calls, MQTT/Kafka/AMQ/ROS topics, cloud IoT core events through MQTT over TLS connections, cloud notifications, WebSocket(s), or the like) through REST APIs.

The heartbeat manager creates and manages heartbeats, missed heartbeat actions, and notifications on demand.

The alerting manager implements alerting and notification based on data-driven automations and/or time. An example of alert request is shown in FIG. 9.

The fault injection manager Provide basic services to create testing condition to validate whether the created SLA can withstand failures.

The data collection endpoint creation manager manages the lifecycle of data collection endpoints. It is the frontend microservice to create to collect KPIs when starting a new SLA. It can also provide custom data collection endpoints that are not used by any SLA.

The configuration manager manages system parameters and microservice configurations across the various applications. It may adopt the ATOMIX framework to distribute the configuration across different nodes. However, it will be appreciated that various other frameworks may be used.

The statistics manager provides basic services for computing statistical functions on any data point. It can be attached to any KPIs dynamically using the provided REST API. It can support mean, standard deviation (stddev), variance, percentile, median, minimum (min), maximum (max), cumulative sum, sample count, or the like, as well as various combinations thereof.

The OVS manager provides OVS management services and OVS termination endpoints. It includes an API for creating, updating, and deleting OVS rules, creating VXLAN and GRE tunnels across different endpoints, allocating network services, and supporting the basic network control operation of the framework.

The SLA manager compiles the SLA request and decomposes the SLA request into commands to create data collection endpoints, network sounding functions, notifications, and actions based on the SLA KPIs. The SLA manager also performs checks on SLA violations based on the collected data and on the SLA conditions specified in the SLA request.

The framework may include a number of features to make the interactions between the services reliable and fault-tolerant. For example, the framework may include a service registry, a service gateway, a discovery-aware micro-service client, or the like.

The framework, as indicated above, may include a service registry that holds a list of all the active services, their endpoints, and access details (e.g., DNS and port number). Each service in the framework registers itself with the service registry, including specifying host, port, and node name. Each of the services of the framework may implement a client-side service discovery that allows services to find and communicate with each other without hard-coding hostname and port. The only 'fixed point' in such an architecture consists of the service registry endpoint with which each service has to register. To be informed about the presence of a client, the services send a heartbeat signal to the registry.

The framework, as indicated above, may include a service gateway that performs load balancing of requests over the micro-services registered in the service registry. This way the architecture makes it possible to have the same service implemented by distinct micro-services for performance and fault-tolerance purposes.

Figure 10:
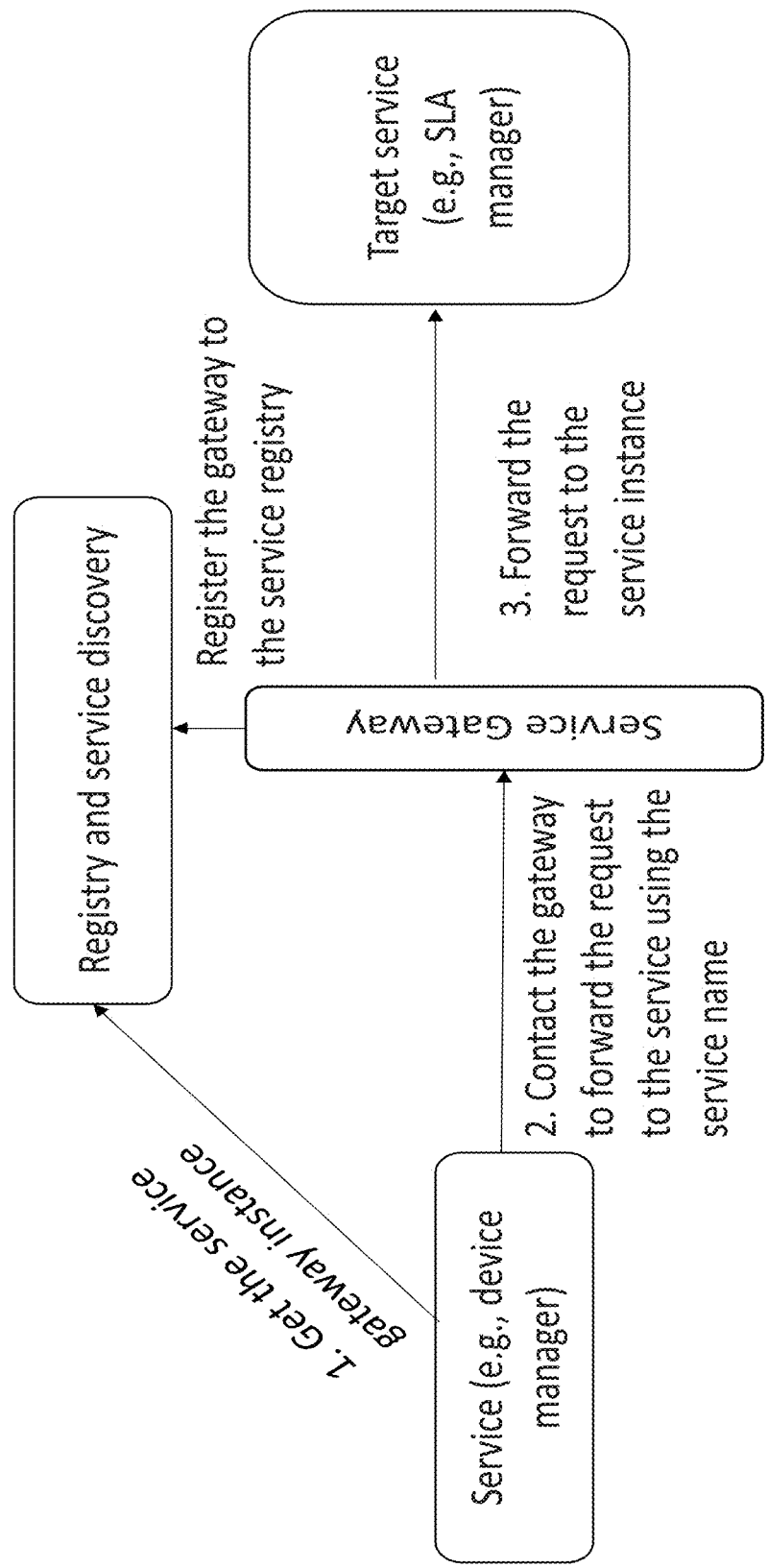
FIG. 10 depicts an example embodiment of service discovery in the system architecture of FIG. 6.

The framework, as indicated above, may include a discovery-aware micro-service client implemented in each of the micro-services of the platform that enables communication across micro-services using service-names instead of service-URLs. This way client service requests can fetch the service topology by querying the service registry for endpoints capable of fulfilling that specific type of request (e.g., creating a new SLA). The service registry will return the endpoint capable of fulfilling the request, currently up and running, and that satisfies the policy of the implemented load balancing algorithm. This interaction mechanism is depicted in FIG. 10.

Figure 11:
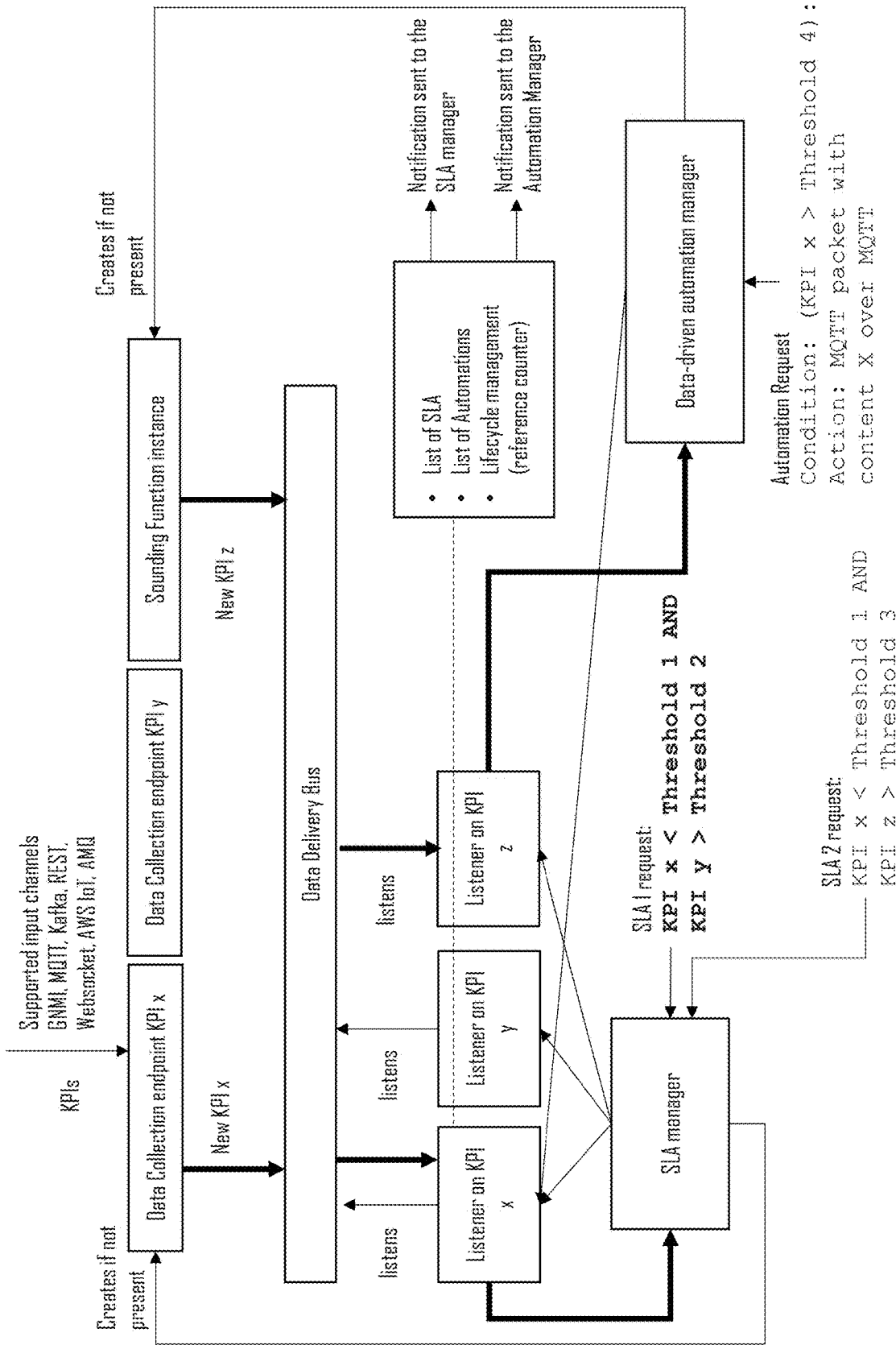
FIG. 11 depicts an example embodiment of a KPI collection and delivery bus configured to support use of key performance indicators (KPIs) in the system architecture of FIG. 6.

FIG. 11 depicts an example embodiment of a KPI collection and delivery bus configured to support use of KPIs for use in selection of wireless access interfaces for network services at AMH devices.

As illustrated in FIG. 11, the SLA manager may be configured to receive the SLA request JSON and program the framework for creating all the data collection infrastructure and for provisioning the network services object of the SLA. The SLA request is compiled and decomposed in commands to create data collection endpoints, network sounding functions, notifications, and actions based on the SLA KPIs. The SLA manager also may be configured to perform checks on SLA violations based on the collected data and on the SLA conditions specified in the SLA request as discussed further below.

As illustrated in FIG. 11, creation of on-demand data collection endpoints and sounding functions may be performed based on the following algorithm. The SLA manager compiles the SLA request and identifies the KPIs that have to be collected, statistical functions to be estimated, and other parameters. The identified KPIs are specified using a well-defined set of KPIs supported by the platform. The identified KPIs are used to generate i) appropriate mechanisms to collect data, and ii) listeners for when new KPI values are available for enabling SLA computation. For data collection, once the KPIs are extracted, the compiler is capable of mapping the KPIs to supported sounding functions (e.g., 2-way network latency between two nodes is mapped to a sounding function sending PING commands with the right period). For data collection, if there are no sounding functions implementing the data collection process, the framework creates an on-demand data collection endpoint for each KPI. Endpoints are passive data collection input ports that can be used to receive data (e.g., in case of REST and WebSocket endpoints) or to subscribe to data (e.g., in case of MQTT, Kafka, AMQ and gNMI). The type of endpoint (i.e., if REST, WebSocket, MQTT, Kafka, AMQ or gNMI) can be specified directly in the SLA request, can be decided a priori using a configuration file, or can changed after the endpoint is created through dedicated APIs. In all cases, after the creation of endpoints data has to be sent there from collection. It is noted that it is possible also to generate hybrid endpoints by requesting so in the SLA request. In this case, the data collection will happen periodically by scheduling data pull requests (e.g., gNMI data fetches or REST calls) through the sounding function scheduler.

Figures 12, 13:
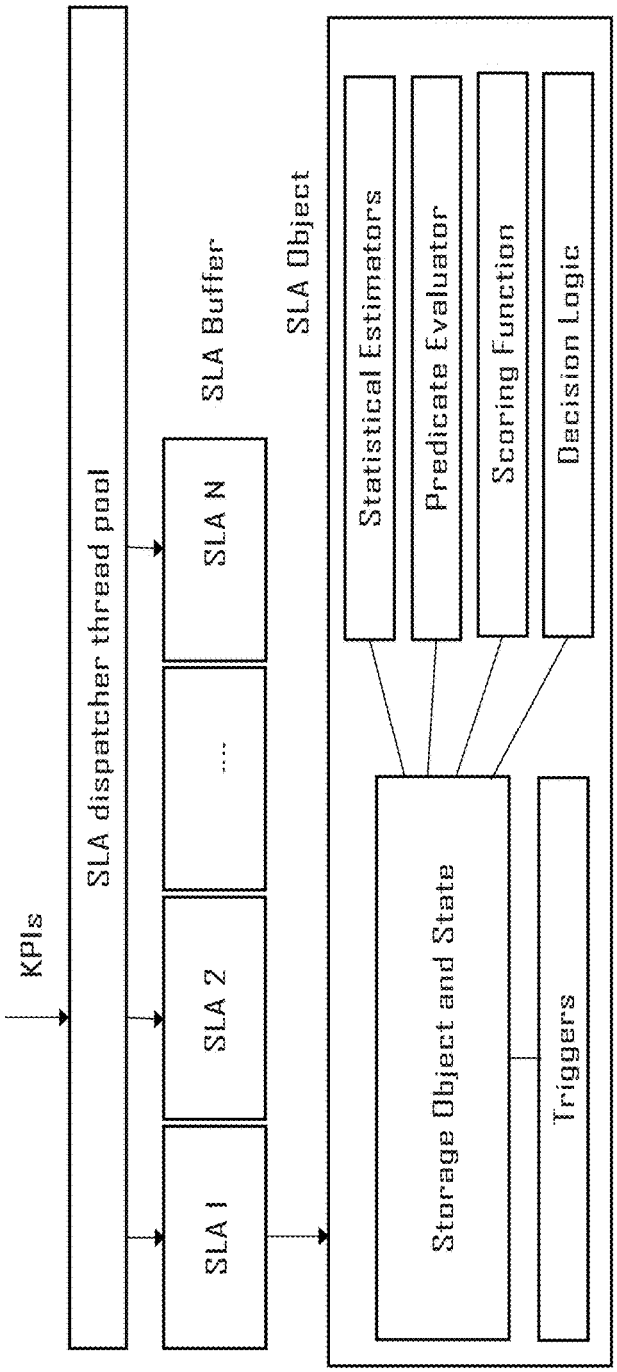
FIG. 12 depicts an example embodiment of an SLA watcher component configured to validate SLAs to support use of SLAs in the system architecture of FIG. 6.
FIG. 13 depicts an example of an SLA scoring algorithm configured to score SLAs for wireless access interfaces of AMHs.

FIG. 12 depicts an example embodiment of an SLA watcher component configured to validate SLAs to support use of SLAs in the system architecture of FIG. 6. For each collected KPI, a listener thread is created. The KPI listener thread is in charge of computing the SLA predicates included in the SLA definition. KPI values are collected by the data collection endpoints or by the sounding functions and delivered to the KPI listener by the internal data delivery bus. Once received, KPIs values are stored by the KPI listener into an SLA Storage Object shown in FIG. 12, The SLA Storage Object it is implemented as a distributed object across all the KPI listener thread participating to the same SLA. It includes a circular buffer for each KPI with size equal to the number of samples to consider for estimating the statistics as specified in the SLA request. For instance, for the service requested in the example of FIG. 3, the buffer will hold 5 samples. When all 5 samples are present, the statistical function specified in the SLA request ($95^{th}$ percentile in the example) is computed and the final value used for evaluating whether the SLA predicate (i.e., whether the SLA is met or not). The SLA is computed in a measurement cycle, i.e., when all the statistical functions of all the needed KPI across all network interfaces have been computed. When this happens, the algorithm (scoring function) in FIG. 13 is executed.

Figure 14:
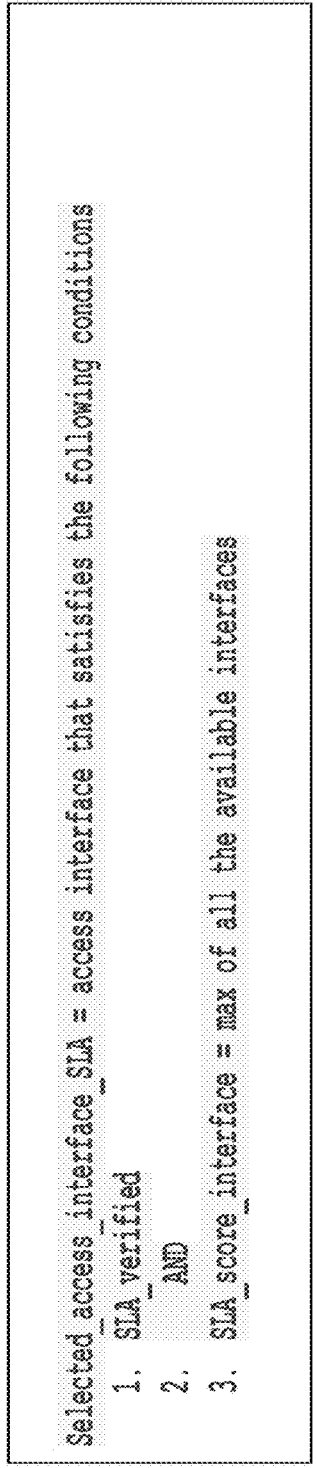
FIG. 14 depicts an example of a wireless access interface selection algorithm configured for selecting wireless access interfaces of AMHs to support network services at the AMHs.
Figure 15:
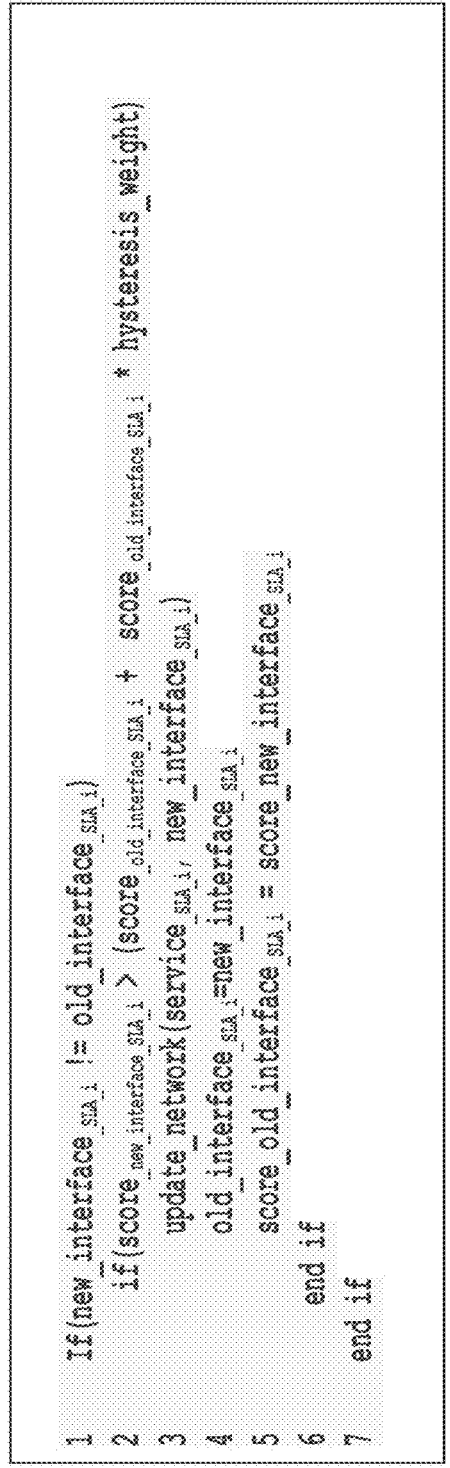
FIG. 15 depicts an example embodiment of a hysteresis algorithm configured to support selection of wireless access interfaces of AMHs to support network services at the AMHs.

After all the interfaces have the updated score in the current measurement cycle, the interface that is most suitable for meeting the SLA for the given network service is selected using the function in FIG. 14. The intuition is that, given that all the network interfaces are evaluated with the same function (line 5 of FIG. 13) it becomes possible to use the value of the score to measure how well an interface can meet a given SLA, The decision algorithm simply selects to provision the network service on the interface that has a verified SLA (i.e., that meets the minimum requirements included in the SLA request) and the highest among all the scores computed for the specific SLA. In order to avoid oscillation (interface flapping), a hysteresis mechanism implemented through a hysteresis weight (in the range of 0.05-0.5) is used as specified in FIG. 15.

The data delivery bus is a custom software component internal to the NiX device manager. Its objective is to create asynchronous one-to-many communications. The component may be implemented using the native Spring boot framework asynchronous event mechanisms through custom event object created on-demand for each KPI.

KPI listeners are central to all the data-driven activities performed by the NiX device manager. That includes SLA computation, KPI-driven network control, data-driven automations. In a nutshell, their objective is to compute a predicate based on fresh values of the data and, if the predicate is verified, generate programmed triggers (e.g., network control actions or notification to other components), In order to reduce the complexity and number of the threads executing the KPI listeners functions, each KPI listener holds a table of references to all the microservices that are interested in that specific KPI. The pattern is that each microservice advertise its need of using a specific KPI over the data delivery bus. If any of the available KPI listener is actually managing that specific KPI, it will notify the microservice that the request is accepted. In case there are no KPI listeners active for that specific KPI, the data delivery bus will notify a KPI creator microservice that will create the KPI listener.

Upon stopping each microservice currently using a given KPI, the microservice notifies the KPI listener that, in turn, removes the reference to the microservice from its usage table. When the table is empty, the KPI listener terminates and the thread terminates. This mechanism is also used for the sounding function and for the data collection endpoint threads since it simplifies the management of threads across the platform. With this solution, threads also can be executed outside the context of the NiX device manager, for instance, as additional external micro-services.

Figure 16:
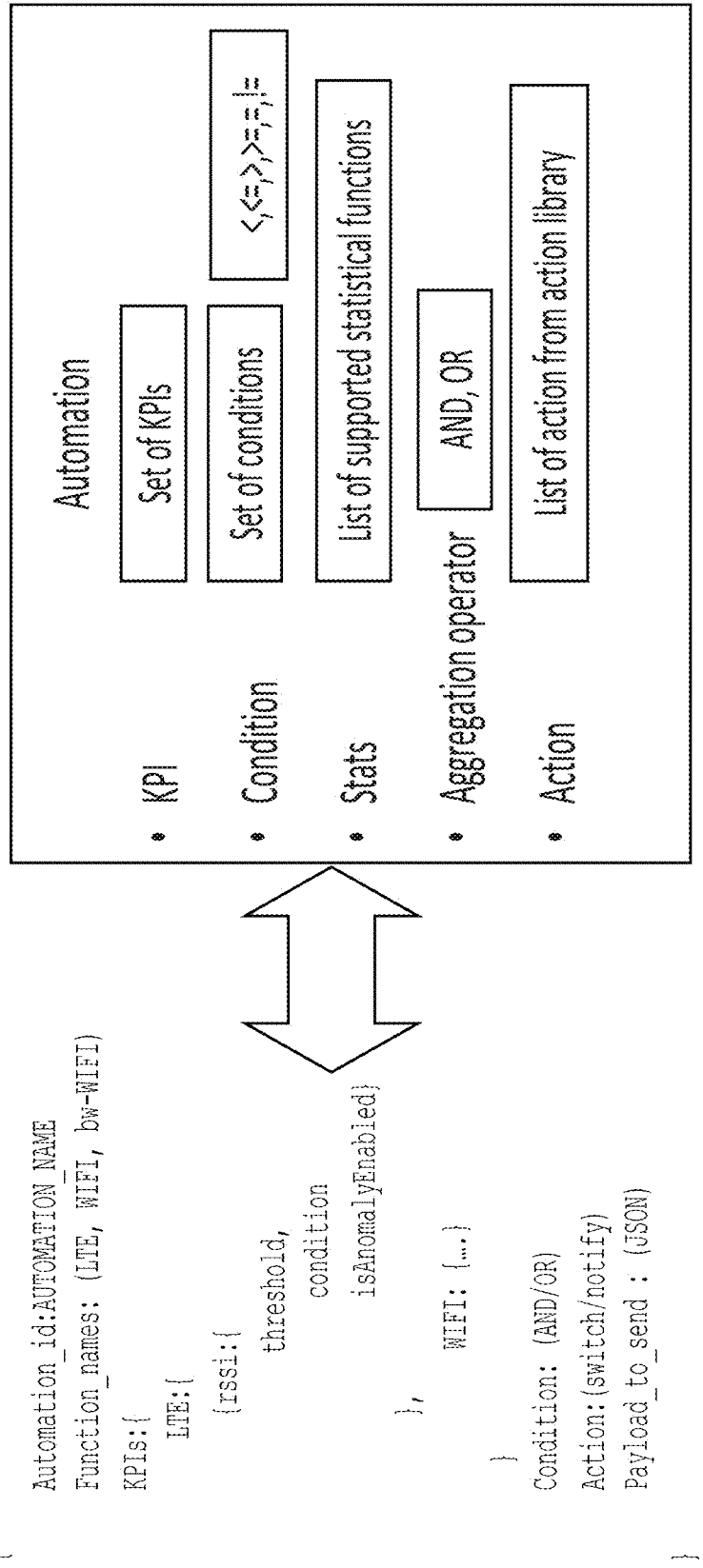
FIG. 16 depicts an example embodiment of a data-driven automation request model that includes an automation request and an automation data structure for illustrating a mapping of the automation request to the automation data structure.
Figure 17:
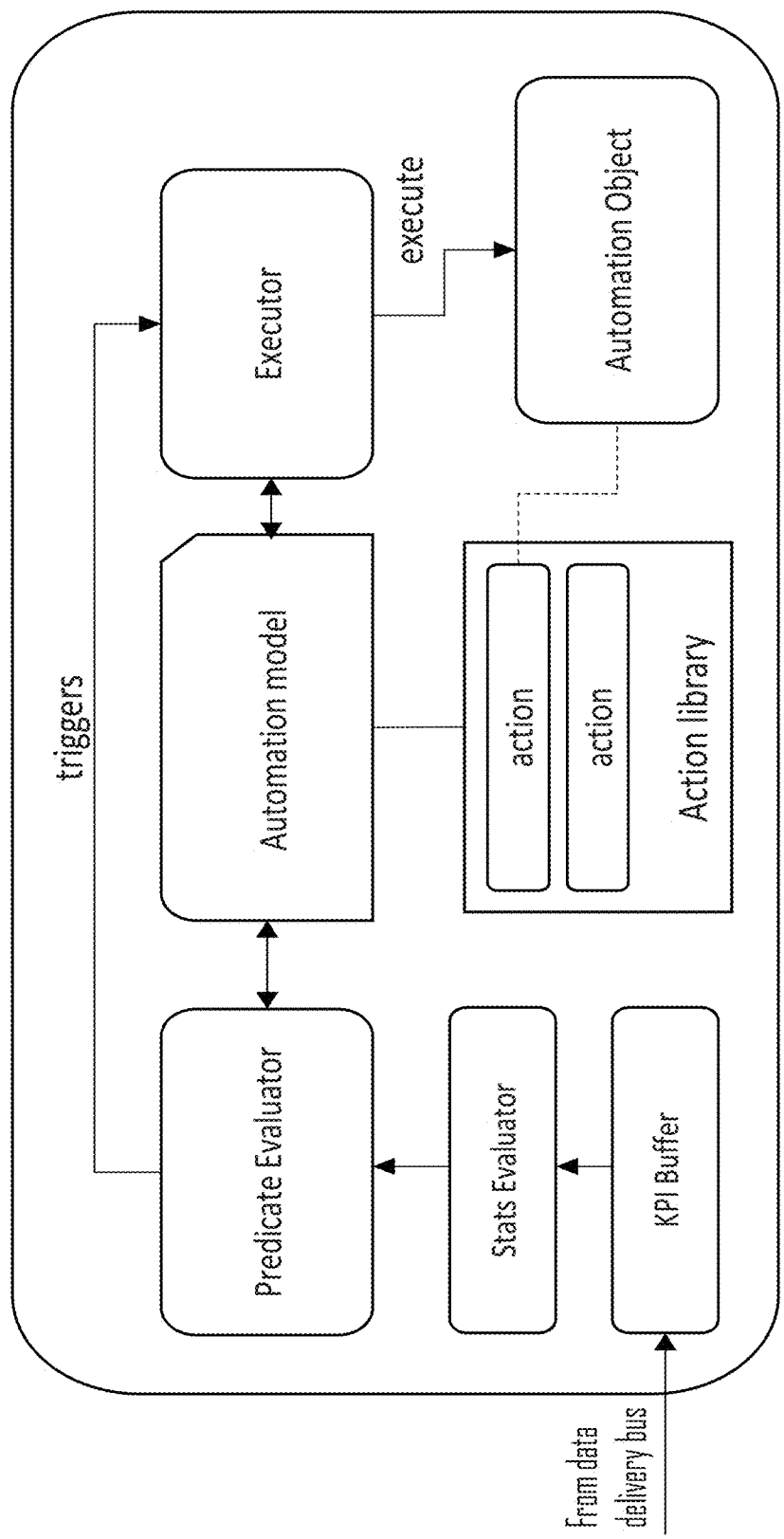
FIG. 17 depicts an example embodiment of platform support for data-driven automations based on the data-driven automation request model of FIG. 16.

In addition to SLA evaluation, KPI listeners also are used to provide a trigger for data-driven automations, including KPI-driven network control. An example of a data-driven automation request model is shown in FIG. 16. Similarly to SLA requests, the data-driven automation requests include i) a list of KPI, ii) a list of statistical functions (e.g., mean, min, percentiles, with specification of the min number of samples needed) that need to be evaluated on the received KPI values, iii) a list of predicates (conditions and right value operator) to be evaluated against the list of provided statistical functions, iv) an aggregation operator to aggregate the evaluated predicates in a unique logical condition (e.g., trigger the action if and only if all the predicates are verified), and v) a list of operations (e.g., send REST command or MQTT packet) to perform if the overall predicate is verified. FIG. 17 shows the internals of the data-driven automation manager component contained in the KPI listener. Upon receiving a new KPI value, 1) the stats evaluator component evaluates the statistical functions needed to evaluate the automation predicate if the specified number of samples are available in the buffer, 2) the output value is given to the predicate evaluator that evaluates the predicate (set of conditions and condition value) included in the automation description object, and 3) if the predicate is verified, the predicate evaluator triggers the executor that execute the actions specified in the automation description.

Figure 18:
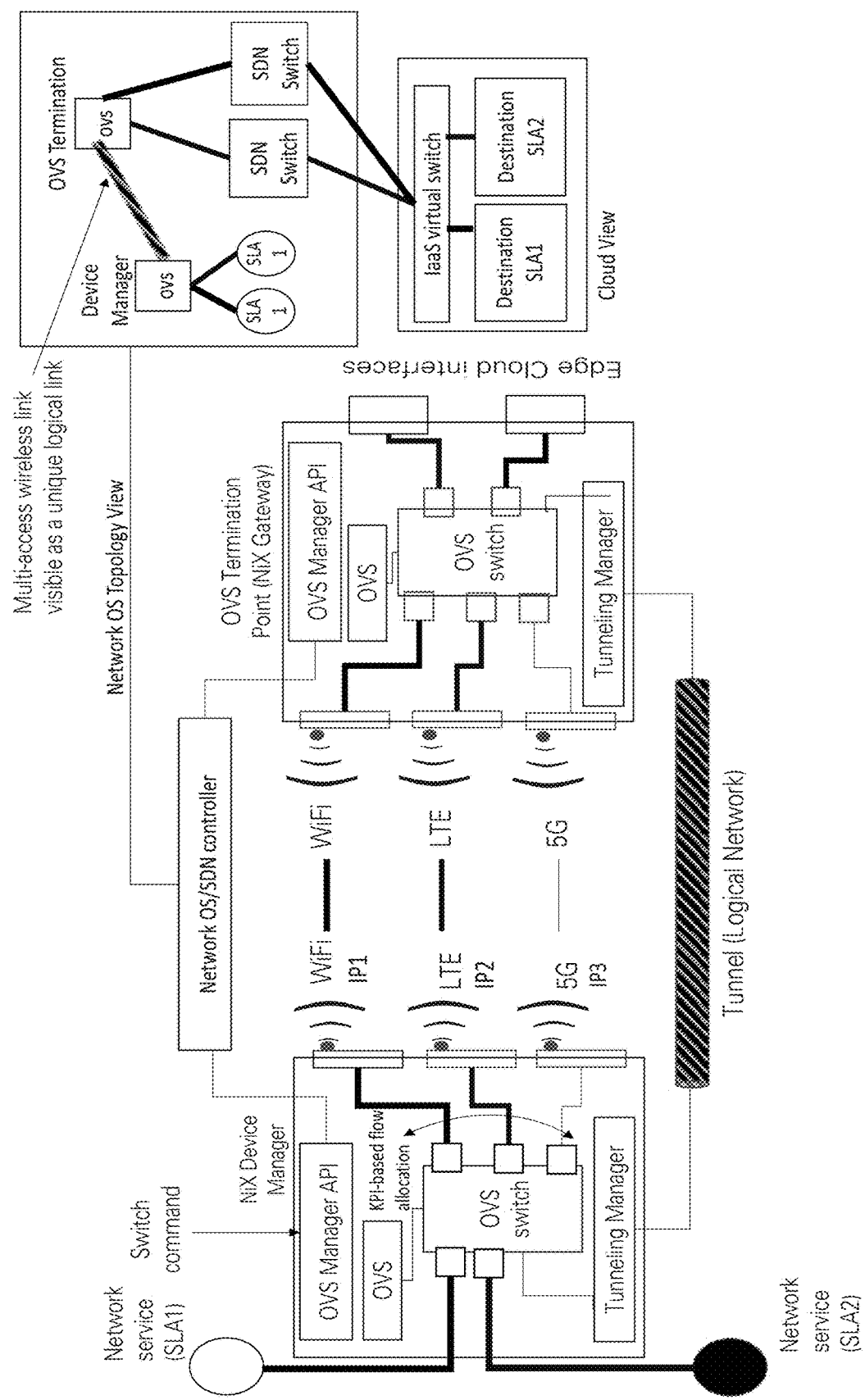
FIG. 18 depicts an example embodiment of a network diagram for illustrating service allocations for network services support by an AMH device.

FIG. 18 depicts the network diagram of the implemented network control solution. The idea is to create an SDN topology using OVS and OpenFlow switches to enable network programmability end to end. OVS may use the Link Layer Discovery Protocol (LLDP) to discover the topology. LLDP packets are not forwarded over the wireless medium by default. For enabling the discovery of the OVS topology using LLDP over wireless links, the framework creates a GRE tunnel from/to an OVS termination node running on the gateway and hosting an OVS switch managed by the same SDN controller. Using this technique the LLDP packets are encapsulated in the GRE tunnel packets and hence the detection of links between the two OVS switches (one on the device and another one on the gateway) is made possible. The algorithm used for this task is shown in FIG. 19.

Using this technique (1) the SDN topology managed by the SDN controller includes the device managed by the framework and the connecting link is the overlay network implemented using the GRE tunnel between the device managed by the framework and the OVS termination node and (2) the GRE tunnel is managed locally on the device and the allocation of the link over one of the available access interfaces is performed by selecting the access interface with the lowest latency towards the OVS termination node.

Using this technique the SDN controller is aware of the connection between the device manager and the gateway and can program the end to end network. However, given that the approach masks the number of available access interfaces under a unique connection (the overlay network), the SDN controller, when creating an end-to-end network service (intent) between the device managed by the framework and any node controlled by the SDN controller, will (1) use the only available link from the device managed by the framework and the OVS termination node and (2) program the network from the OVS termination node to the final destination creating a VXLAN intent over the best path for the current algorithms and metrics specified in the Intent definition (e.g., network capacity and/or latency). The algorithm implemented to allocate a new network service is shown in FIG. 20. In order to avoid link flapping and high-frequency switch command, an exponential back-off algorithm is implemented to establish the minimum wait time between two consecutive switch commands.

It will be appreciated that, although primarily presented herein with the context of supporting selection of wireless access interfaces for particular types of devices operating in a particular type of environment (namely, an AMH environment including AMH devices such as AGVs, robots, or the like), various example embodiments for supporting selection of wireless access interfaces may be applied for supporting selection of wireless access interfaces for various other types of autonomous devices (e.g., drones such as surveillance drones, construction devices, mining devices, autonomous electronic vehicles, or the like) which may operate in various other contexts (e.g., surveillance environments, construction environments, mining environments, transportation environments, or the like).

within various other contexts for supporting selection of wireless access interfaces of various other types of autonomous devices which may operate within various other contexts.

Figure 21:
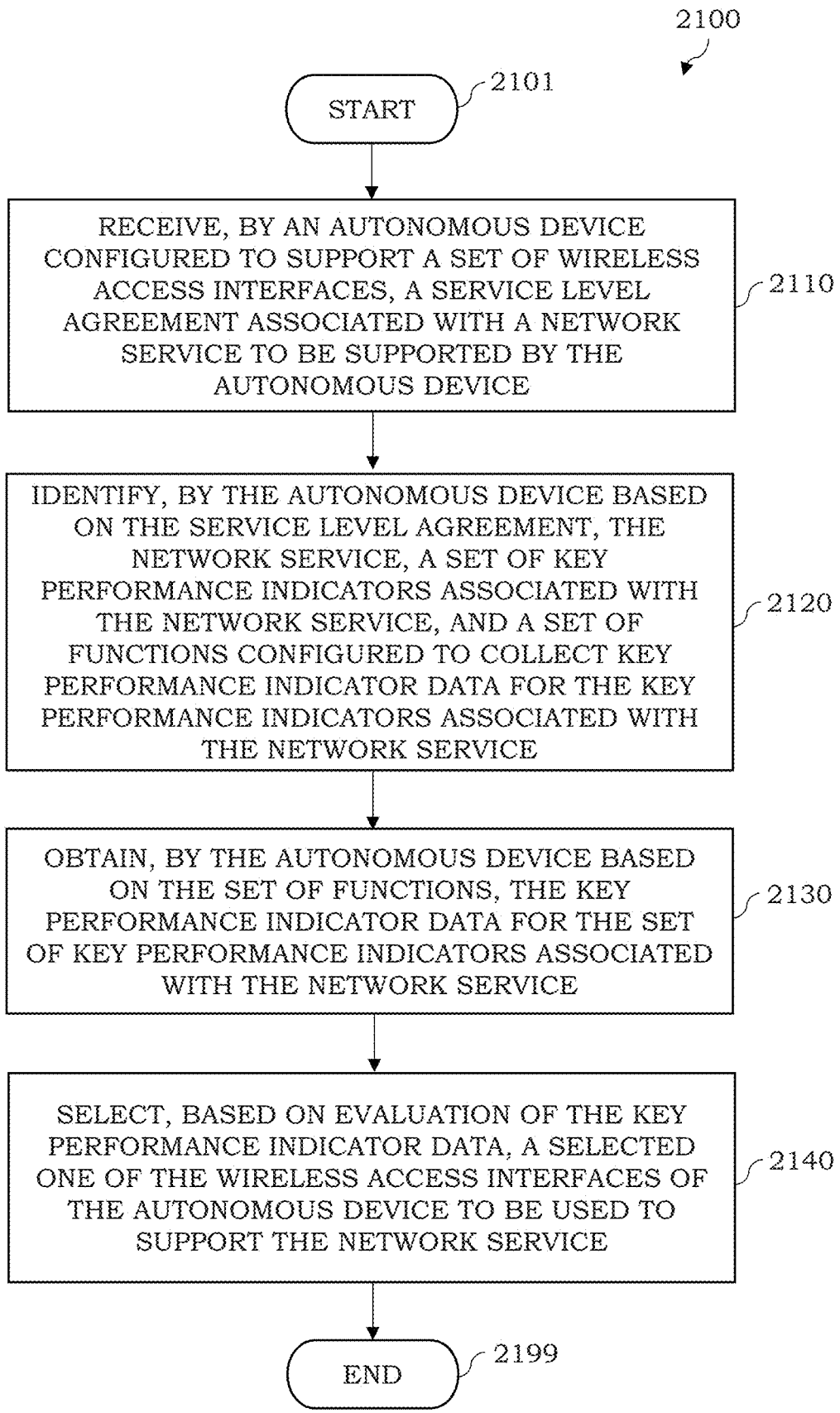
FIG. 21 depicts an example embodiment of a method for use by an autonomous device to support selection of a wireless access interface of the autonomous device for a network service to be supported at the autonomous device.

FIG. 21 depicts an example embodiment of a method for use by an autonomous device to support selection of a wireless access interface of the autonomous device for a network service to be supported at the autonomous device. It will be appreciated that, although primarily presented as being performed serially, at least a portion of the functions of method 2100 may be performed contemporaneously or in a different order than as presented in FIG. 21. At block 2101, the method 2100 begins. At block 2110, receive, by an autonomous device configured to support a set of wireless access interfaces, a service level agreement associated with a network service to be supported by the autonomous device. At block 2120, identify, by the autonomous device based on the service level agreement, the network service, a set of key performance indicators associated with the network service, and a set of functions configured to collect key performance indicator data for the key performance indicators associated with the network service. At block 2130, obtain, by the autonomous device based on the set of functions, the key performance indicator data for the set of key performance indicators associated with the network service. At block 2140, select, based on evaluation of the key performance indicator data, a selected one of the wireless access interfaces of the autonomous device to be used to support the network service. At block 2199, the method 2100 ends.

Figure 22:
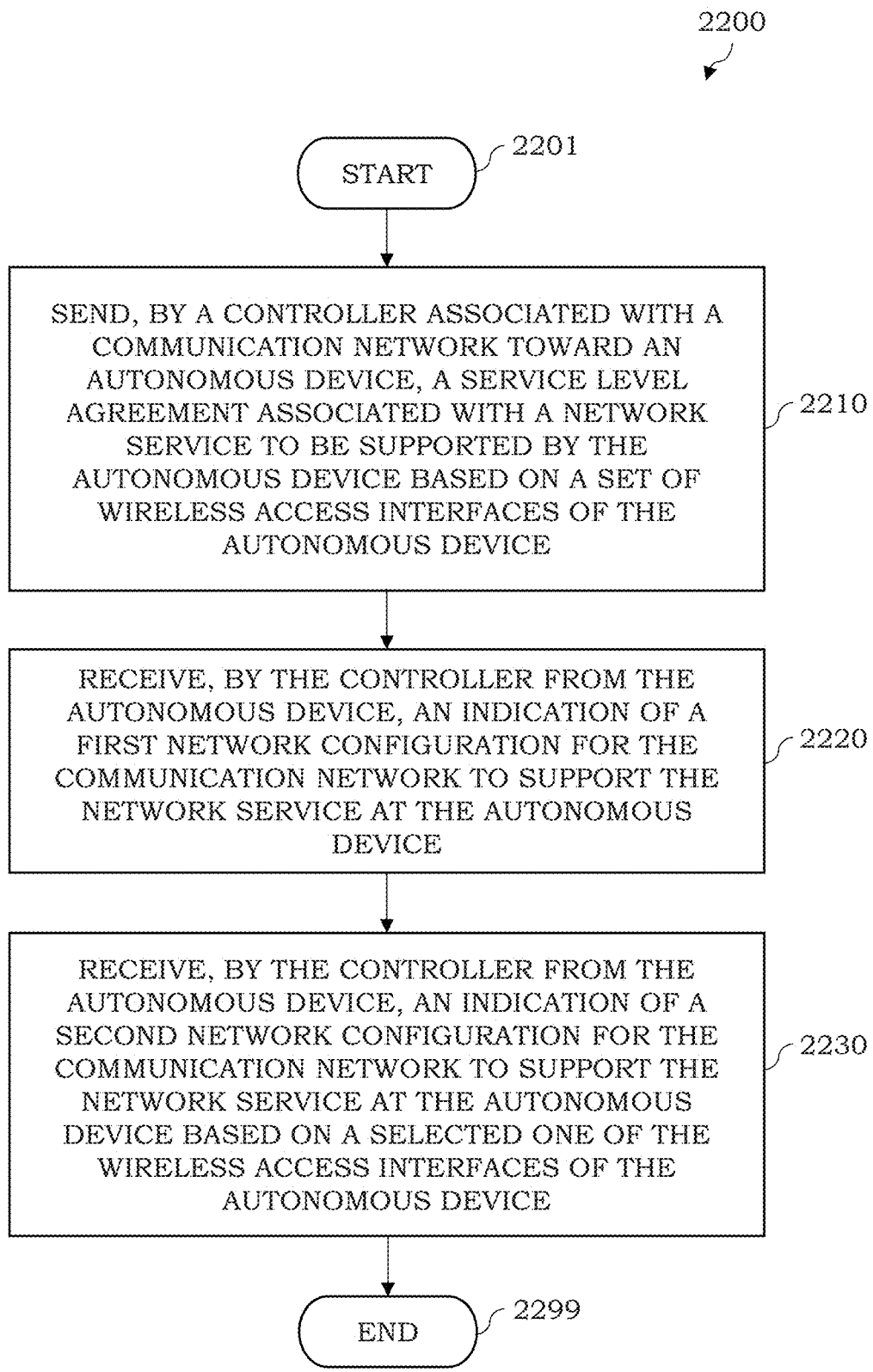
FIG. 22 depicts an example embodiment of a method for use by a network controller to support selection of a wireless access interface of the autonomous device for a network service to be supported at the autonomous device.

FIG. 22 depicts an example embodiment of a method for use by a network controller to support selection of a wireless access interface of an autonomous device for a network service to be supported at the autonomous device. It will be appreciated that, although primarily presented as being performed serially, at least a portion of the functions of method 2200 may be performed contemporaneously or in a different order than as presented in FIG. 22. At block 2201, the method 2200 begins. At block 2210, send, by a controller associated with a communication network toward an autonomous device, a service level agreement associated with a network service to be supported by the autonomous device based on a set of wireless access interfaces of the autonomous device. At block 2220, receive, by the controller from the autonomous device, an indication of a first network configuration for the communication network to support the network service at the autonomous device. At block 2230, receive, by the controller from the autonomous device, an indication of a second network configuration for the communication network to support the network service at the autonomous device based on a selected one of the wireless access interfaces of the autonomous device. At block 2299, the method 2200 ends.

Various example embodiments for supporting wireless connectivity for AMH may provide various advantages or potential advantages. For example, various example embodiments for supporting wireless connectivity for AMH may be configured to ensure reliable communication of AMH devices in an AMH environment to the network infrastructure deployed in the AMH environment. For example, various example embodiments for supporting wireless connectivity for AMH may be configured to ensure reliable communication of AMH devices in an AMH environment to the network infrastructure deployed in the AMH environment by ensuring that the AMH devices can roam smoothly between access points and access technologies with minimal handover time. For example, various example embodiments for supporting wireless connectivity for AMH may be configured to ensure reliable communication of AMH devices in an AMH environment to the network infrastructure deployed in the AMH environment, by ensuring that the AMH devices can roam smoothly between access points and access technologies with minimal handover time, without having to use a one-size fits all approach based on a single access technology (e.g., without having to wait for disconnection events when the AGV is unable to communicate before initiating handover, without having to use fixed physical/radio KPI thresholds (e.g., Received Signal Strength Indicator), and so forth). Various example embodiments for supporting wireless connectivity for AMH may provide various other advantages or potential advantages.

Figure 23:
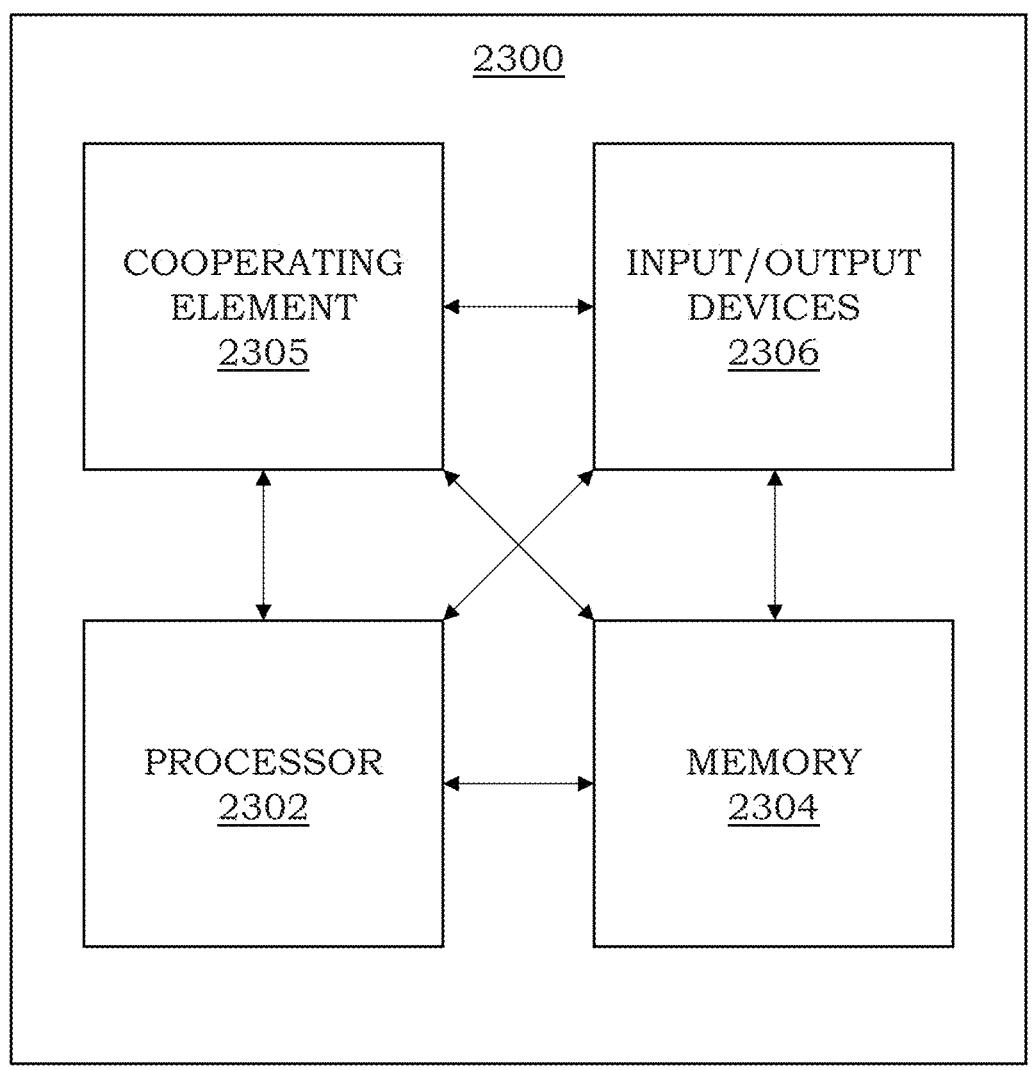
FIG. 23 depicts an example embodiment of a computer suitable for use in performing various functions presented herein.

FIG. 23 depicts an example embodiment of a computer suitable for use in performing various functions presented herein.

The computer 2300 includes a processor 2302 (e.g., a central processing unit (CPU), a processor, a processor having a set of processor cores, a processor core of a processor, or the like) and a memory 2304 (e.g., a random access memory, a read only memory, or the like). The processor 2302 and the memory 2304 may be communicatively connected. In at least some example embodiments, the computer 2300 may include at least one processor and at least one memory including a set of instructions, wherein the set of instructions is configured to, when executed by the at least one processor, cause the computer to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including a set of instructions;
wherein the set of instructions is configured to, when executed by the at least one processor, cause the apparatus to:
receive, by an autonomous device configured to support a set of wireless access interfaces, a service level agreement associated with a network service to be supported by the autonomous device;
identify, by the autonomous device based on the service level agreement, the network service, a set of key performance indicators associated with the network service, and a set of functions configured to collect key performance indicator data for the key performance indicators associated with the network service;
obtain, by the autonomous device based on the set of functions, the key performance indicator data for the set of key performance indicators associated with the network service; and
select, based on evaluation of the key performance indicator data, a selected one of the wireless access interfaces of the autonomous device to be used to support the network service.

2. The apparatus of claim 1, wherein the network service, the set of key performance indicators associated with the network service, and the set of functions configured to collect key performance indicator data for the key performance indicators associated with the network service are determined based on compilation and decomposition of the service level agreement at the autonomous device.

3. The apparatus of claim 1, wherein the set of instructions is configured to, when executed by the at least one processor, cause the apparatus to:
identify, by the autonomous device based on the service level agreement, a network configuration for a communication network configured to support communications of the autonomous device.

4. The apparatus of claim 3, wherein the set of instructions is configured to, when executed by the at least one processor, cause the apparatus to:
send, by the autonomous device toward a controller of the communication network, an indication of the network configuration for the communication network.

5. The apparatus of claim 3, wherein the network configuration for the communication network is configured to provide an initial allocation of the network service for the autonomous device based on a first one of the wireless access interfaces of the autonomous device.

6. The apparatus of claim 5, wherein at least a portion of the key performance indicator data for the set of key performance indicators associated with the network service is obtained based on the initial allocation of the network service for the autonomous device.

7. The apparatus of claim 5, wherein the set of instructions is configured to, when executed by the at least one processor, cause the apparatus to:
switch, at the autonomous device for the network service, from the first one of the wireless access interfaces of the autonomous device to the selected one of the wireless access interfaces of the autonomous device.

8. The apparatus of claim 1, wherein the set of key performance indicators includes a key performance indicator supported by the autonomous device.

9. The apparatus of claim 8, wherein the set of functions configured to collect key performance indicator data for the key performance indicators associated with the network service includes a data collection function configured to collect data for the key performance indicator supported by the autonomous device.

10. The apparatus of claim 9, wherein the set of instructions is configured to, when executed by the at least one processor, cause the apparatus to:

send, by the autonomous device, a message for configuring the data collection function to collect the data for the key performance indicator supported by the autonomous device.

11. The apparatus of claim 1, wherein the set of key performance indicators includes a key performance indicator unsupported by the autonomous device.

12. The apparatus of claim 11, wherein the set of functions configured to collect key performance indicator data for the key performance indicators associated with the network service includes a sounding function configured to estimate data for the key performance indicator unsupported by the autonomous device.

13. The apparatus of claim 12, wherein the set of instructions is configured to, when executed by the at least one processor, cause the apparatus to:
send, by the autonomous device, a message for configuring the sounding function to collect the data for the key performance indicator unsupported by the autonomous device.

14. The apparatus of claim 1, wherein, to select the selected one of the wireless access interfaces of the autonomous device to be used to support the network service, the set of instructions is configured to, when executed by the at least one processor, cause the apparatus to:
determine, by the autonomous device for each of the wireless access interfaces based on the key performance indicator data for the set of key performance indicators associated with the network service, whether the respective wireless access interface satisfies the service level agreement associated with the network service; and
select, by the autonomous device from ones of the wireless access interfaces determined to satisfy the service level agreement associated with the network service, the selected one of the wireless access interfaces of the autonomous device to be used to support the network service.

15. The apparatus of claim 1, wherein, to select the selected one of the wireless access interfaces of the autonomous device to be used to support the network service, the set of instructions is configured to, when executed by the at least one processor, cause the apparatus to:
compute, by the autonomous device based on the key performance indicator data for the set of key performance indicators associated with the network service, respective dimensionless scores for the respective wireless access interface; and
select, by the autonomous device based on the respective dimensionless scores for the respective wireless access interfaces, the selected one of the wireless access interfaces of the autonomous device to be used to support the network service.

16. The apparatus of claim 1, wherein the set of instructions is configured to, when executed by the at least one processor, cause the apparatus to:
send, by the autonomous device based on the selected one of the wireless access interfaces of the autonomous device to be used to support the network service, a message configured to request configuration of a communication network to support use of the selected one of the wireless access interfaces of the autonomous device to support the network service.

17. The apparatus of claim 1, wherein the set of wireless access interfaces includes at least one of a WiFi access interface or a cellular access interface.

18. The apparatus of claim 1, wherein the autonomous device is an autonomous guided vehicle or a robot.

19. The apparatus of claim 1, wherein the autonomous device is configured to operate within an autonomous materials handling environment.

20. A method, comprising:
receiving, by an autonomous device configured to support a set of wireless access interfaces, a service level agreement associated with a network service to be supported by the autonomous device;
identifying, by the autonomous device based on the service level agreement, the network service, a set of key performance indicators associated with the network service, and a set of functions configured to collect key performance indicator data for the key performance indicators associated with the network service;
obtaining, by the autonomous device based on the set of functions, the key performance indicator data for the set of key performance indicators associated with the network service; and
selecting, based on evaluation of the key performance indicator data, a selected one of the wireless access interfaces of the autonomous device to be used to support the network service.

21. An apparatus, comprising:
at least one processor; and
at least one memory including a set of instructions;
wherein the set of instructions is configured to, when executed by the at least one processor, cause the apparatus to:
send, by a controller associated with a communication network toward an autonomous device, a service level agreement associated with a network service to be supported by the autonomous device based on a set of wireless access interfaces of the autonomous device;
receive, by the controller from the autonomous device, an indication of a first network configuration for the communication network to support the network service at the autonomous device; and
receive, by the controller from the autonomous device, an indication of a second network configuration for the communication network to support the network service at the autonomous device based on a selected one of the wireless access interfaces of the autonomous device.

\* \* \* \* \*